(12) United States Patent
Baghdadi et al.

(10) Patent No.: US 11,370,155 B2
(45) Date of Patent: Jun. 28, 2022

(54) MOLDING SYSTEM AND METHOD

(71) Applicant: NIKE, Inc., Beaverton, OR (US)

(72) Inventors: Hossein A. Baghdadi, Portland, OR (US); Sami Mohamad Fakhouri, Portland, OR (US); Joseph Thomas Muth, North Plains, OR (US); Bradley C. Tutmark, Aloha, OR (US); H. Kenneth Hanson, III, Cincinnati, OH (US); Danny David Lumpkin, Cincinnati, OH (US); Robert L. Ritchie, Warsaw, IN (US); Shawn J. Schnee, Liberty Township, OH (US)

(73) Assignee: NIKE, Inc, Beaverton, OR (US)

( * ) Notice: Subject to any disclaimer, the term of this patent is extended or adjusted under 35 U.S.C. 154(b) by 201 days.

(21) Appl. No.: 16/578,129

(22) Filed: Sep. 20, 2019

(65) Prior Publication Data
US 2020/0094458 A1 Mar. 26, 2020

Related U.S. Application Data

(60) Provisional application No. 62/734,912, filed on Sep. 21, 2018.

(51) Int. Cl.
*B29C 45/27* (2006.01)
*B29C 45/77* (2006.01)
(Continued)

(52) U.S. Cl.
CPC .......... *B29C 45/2703* (2013.01); *B29C 45/77* (2013.01); *B29C 45/78* (2013.01);
(Continued)

(58) Field of Classification Search
CPC ..... B29C 45/2703; B29C 45/77; B29C 45/78; B29C 45/2706; B29C 2045/2722; B29C 2045/1727
See application file for complete search history.

(56) References Cited

U.S. PATENT DOCUMENTS

| 4,337,027 A | * | 6/1982 | Montieth | ............ B29C 45/2703 |
| | | | | 425/562 |
| 4,678,420 A | * | 7/1987 | Inoue | ..................... B29C 45/18 |
| | | | | 425/144 |

(Continued)

FOREIGN PATENT DOCUMENTS

| CN | 1287506 A | 3/2001 |
| CN | 101879768 A | 11/2010 |

(Continued)

OTHER PUBLICATIONS

ISA European Patent Office, International Search Report and Written Opinion Issued in Application No. PCT/US2019/052282, dated Nov. 15, 2019, WIPO, 13 pages.

*Primary Examiner* — Kelly M Gambetta
*Assistant Examiner* — Virak Nguon
(74) *Attorney, Agent, or Firm* — Shook, Hardy & Bacon L.L.P.

(57) ABSTRACT

A molding system and a method for operation of the molding system are provided. The method includes flowing a molten polymeric material into a shot tuning chamber from an upstream device, adjusting a temperature of and/or pressure applied to the molten polymeric material in the shot tuning chamber, and flowing the molten polymeric material from the shot tuning chamber into a mold cavity.

20 Claims, 9 Drawing Sheets

(51) Int. Cl.
*B29C 45/78* (2006.01)
*B29C 45/17* (2006.01)

(52) U.S. Cl.
CPC .............. *B29C 2045/1727* (2013.01); *B29C 2045/2722* (2013.01)

(56) References Cited

U.S. PATENT DOCUMENTS

| | | |
|---|---|---|
| 5,997,781 A | 12/1999 | Nishikawa et al. |
| 6,328,916 B1 | 12/2001 | Nishikawa et al. |
| 8,137,600 B2 | 3/2012 | Pierick et al. |
| 2004/0009250 A1 | 1/2004 | Schuermann et al. |
| 2012/0052143 A1 | 3/2012 | Chen et al. |
| 2013/0224508 A1* | 8/2013 | Todesco ................. B29C 45/77 428/523 |
| 2013/0285273 A1 | 10/2013 | Yusa et al. |
| 2019/0047195 A1* | 2/2019 | Yasue .................... B29C 45/54 |
| 2019/0077059 A1* | 3/2019 | Nakatani ................ B29C 45/50 |
| 2019/0366607 A1* | 12/2019 | Lawless, III .......... B29C 45/174 |

FOREIGN PATENT DOCUMENTS

| | | | |
|---|---|---|---|
| DE | 10055022 A1 | 5/2002 | |
| TW | 201208854 A | 3/2012 | |
| WO | 98/31521 A2 | 7/1998 | |
| WO | 2007026257 A2 | 3/2007 | |
| WO | WO-2007026257 A2 * | 3/2007 | ........... B29C 44/421 |

\* cited by examiner

MOLDING SYSTEM AND METHOD

CROSS REFERENCE TO RELATED APPLICATION

The present application claims priority to U.S. Provisional Patent Application No. 62/734,912, entitled "MOLDING SYSTEM AND METHOD", filed on Sep. 21, 2018. The entire contents of the above-listed application are incorporated herein by reference for all purposes.

FIELD

The present description generally relates to systems and methods for polymer molding.

BACKGROUND

Injection molding systems are used to inject polymer melts into molds to form polymer products, goods, parts, etc. When using injection molding systems to both mold and foam polymeric materials in microcellular injection molding processes, various supercritical fluids (SCFs) such as supercritical nitrogen or supercritical carbon dioxide have been used as physical blowing agents. One method of using SCF as a physical blowing agent involves injecting the SCF into a polymer melt in an injection barrel of an injection molding system, thereby dissolving the SCF in the polymer melt. Another method of using SCF as a blowing agent is to use pellets infused with an SCF to form the polymer melt in an injection barrel of an injection molding system. Both of these methods produce a molten single phase solution (SPS) of the SCF dissolved in the polymeric material.

DETAILED DESCRIPTION

Figure 1:
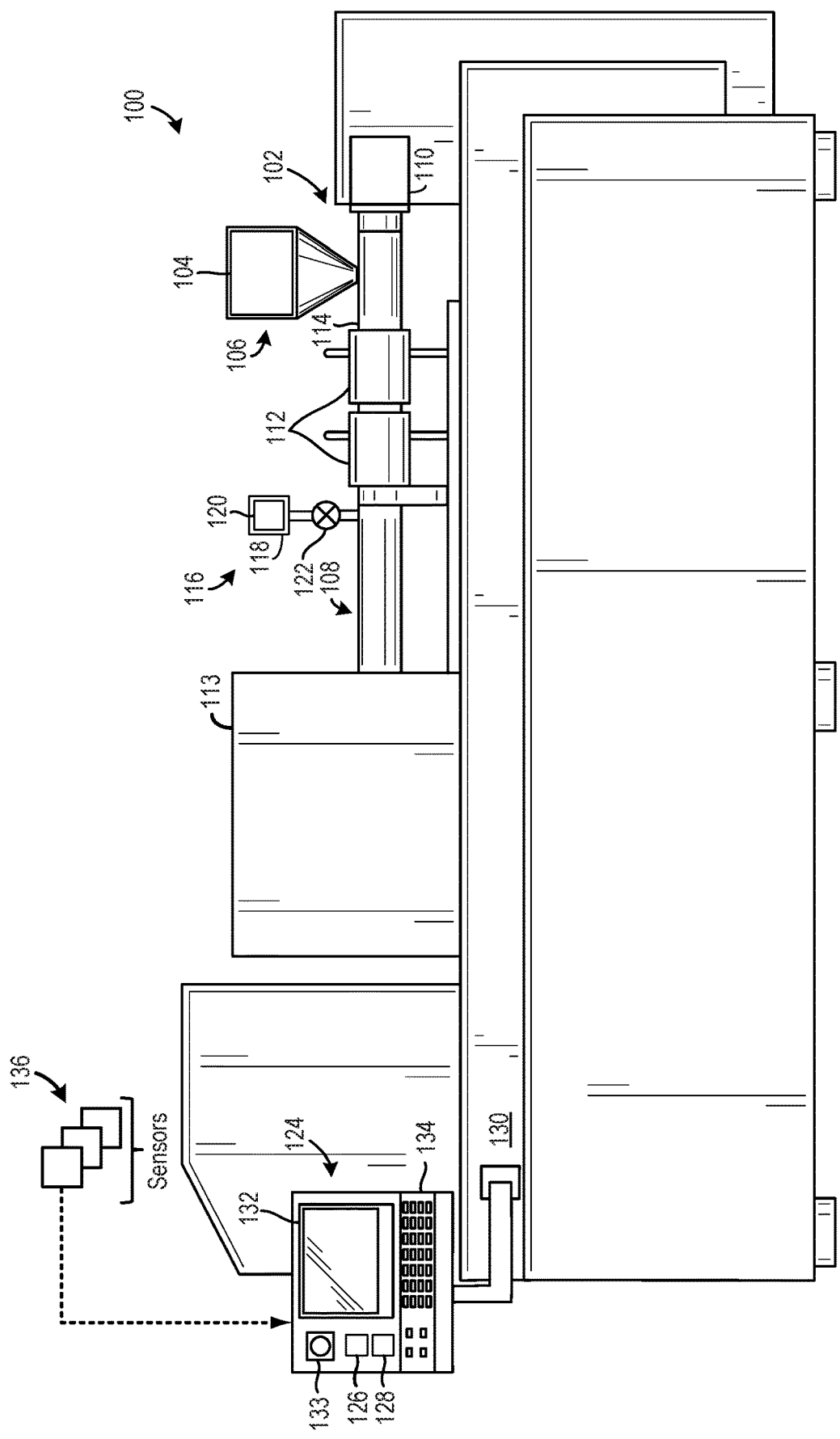
FIG. 1 shows an illustration of a molding system.

Various types of injection molding, such as microcellular foam injection molding, have been used to manufacture plastic products, goods, components, etc. A variety of benefits can be leveraged from microcellular foam injection molding processes such as decreased melt viscosity, decreased injection cycle times, decreased cooling times, decreased product weight while retaining a desired material strength, etc., when compared to other types of injection molding processes. Nevertheless, previous molding systems have suffered from inadequate control over the injection molding process and specifically control over the microcellular foaming process, in the case of microcellular foam injection molding. For example, manifold type systems using valve gates to inject a molten single phase solution (SPS) into the mold generate shear heat, undesirable pressure drops, and other unwanted changes in SPS properties during molding. The shear heating as well as the other unwanted changes in the SPS can in turn cause unwanted nucleation and/or bubble growth. Consequently, strength, stiffness, surface quality, etc., of the plastic product may be decreased. For instance, surface defects such as swirl marks, silver streaks, surface blistering, surface roughness, etc., may be caused by the uncontrolled nucleation and bubble growth. The imprecise temperature and pressure control in the injection process may also cause inhomogeneous bubble size and distribution leading to inconsistent final article density, variable skin thickness, and weak weld lines that further decrease the article's structural integrity and may result in article degradation, in some instances.

The inventor has recognized the abovementioned problems and developed several molding systems and methods which may achieve objectives that at least partially overcome the problems. One of the objectives may be to decrease pressure losses across the system as well as to control (e.g., deliberately increase or decrease) the elongation, apparent shear, and/or zero shear viscosities of the molten polymeric material that is flowed into the mold. In one example, the objectives are at least in part achieved via a method for operation of a molding system. The method includes flowing a molten polymeric material into a shot tuning chamber from an upstream device and adjusting a temperature, a pressure, or both, within the shot tuning chamber to create a tuned molten polymeric material. The method additionally includes flowing the tuned molten polymeric material into a mold cavity from the shot tuning chamber. It will be appreciated that fine-tuning the temperature of and/or pressure applied to the molten polymeric material enables the system to have a desired impact on the physical and mechanical properties of the molded article. In particular, the temperature of the molten polymeric material may be controlled to achieve a desired range of shear/extensional viscosities, which reduces (e.g., substantially eliminates) uncontrolled bubble growth and/or nucleation. In one example, the method may also include adjusting (e.g., increasing and/or decreasing) a pressure in the mold cavity via a gas counter pressure (GCP) assembly prior to or while the molten polymeric material is flowed from the shot tuning chamber into the mold cavity. In such an example, the molten polymeric material may be flowed into the mold cavity at pressures well above ambient pressure. Furthermore, GCP may be introduced into the mold cavity to control nucleation and bubble growth during polymer foaming as well as increase surface quality of the molded article. Nucleation and bubble growth control enhances cell density uniformity and mechanical properties of the molded polymeric material. In some examples, the improvement in cell density homogeneity may be particularly beneficial in articles having low densities such as articles that have a density less than or equal to 0.3 grams (g)/centimeters $(cm)^3$ and/or in articles having large dimensions such as articles having a thickness that is ≥1.0 cm, for instance.

In another example, a system is provided. The system includes a shot tuning chamber configured to receive a molten polymeric material from an upstream device. The shot tuning chamber is also configured to adjust one or more of a temperature of and a pressure applied to the molten polymeric material to create an adjusted molten polymeric material and to dispense the adjusted molten polymeric material. In this way, the system can selectively adjust tuning chamber temperature and/or pressure to achieve desired properties, as previously mentioned. In one example, the system may further include an adjustable mold runner configured to regulate fluidic communication between the shot tuning chamber and a mold cavity in a mold. In another example, the system may further include a GCP assembly coupled to the mold cavity and configured to regulate an amount of counter pressure gas flow into and out of the mold cavity. Providing GCP adjustment allows for additional tuning of the polymeric material as it enters and cools in the mold.

In another example, a molding system is provided that includes a device configured to receive a polymeric material and heat the polymeric material to form a molten polymeric material. The molding system additionally includes a shot tuning chamber configured to receive the molten polymeric material from the device and adjust a temperature of or a pressure applied to the molten polymeric material. The molding system also includes an adjustable mold runner configured to regulate the flow of the molten polymeric material between the shot tuning chamber and a mold cavity. In one example, the device may be an injection device or an extrusion device. The molding system allows the characteristics of the polymeric material to be adapted to achieve desired end-use goals. This new system and approach is not merely an improvement to current molding and/or foaming techniques, but rather creates a new paradigm and thus new systems and methods that operate to achieve a significantly different result.

FIG. 1 shows an illustration of an example of a molding system 100 (e.g., injection molding system). Although the molding system 100, illustrated in FIG. 1, is depicted as an apparatus having various parts, components, etc., enclosed therein or coupled thereto. In other embodiments, various components in the molding system 100 may be at least partially housed in different enclosures that may be spaced away from one another. As such, it will be appreciated that the form, profile, etc., of the molding system may be varied, in other embodiments. Although a molding system is described herein, it will be appreciated that the polymer tuning features of the molding system may be applied to other systems where it is desirable to adjust a temperature and/or pressure in a chamber housing a molten polymeric material.

The molding system 100 includes a device 102 configured to receive a polymeric material 104 (e.g., resin) from a reservoir 106. The device 102 in the illustrated example, is an injection device configured to regulate the flow of molten polymeric material provided to downstream components. However, in other examples, the device 102 may be an extrusion device configured to force molten polymeric material out of an outlet. For instance, the extrusion device may include a feeder pipe, breaker plate, etc., enabling extrusion operation. Furthermore, the device 102 may be referred to as an upstream device when compared to downstream devices such as a shot tuning chamber, discussed in greater detail herein. As such, components in the system may be referred to as upstream and/or downstream components, in some examples. In one example, the reservoir may only store the polymeric material. However, in other examples, the reservoir 106 may include the polymeric material and a blowing agent. The blowing agent may include a physical or chemical blowing agent, in some examples. In one example, the physical blowing agent may be a supercritical fluid (SCF) such as supercritical nitrogen and/or carbon dioxide. However, other types of physical blowing agents have been contemplated such as hydrocarbons (e.g., pentane, isopentane, and/or cyclopentane). When the reservoir 106 includes the polymeric material and the blowing agent, a blowing agent delivery assembly (e.g., blowing agent injector) may deliver a blowing agent to the reservoir 106. However, in other examples, the polymeric material and the blowing agent may be formed external to (e.g., upstream of) the reservoir. The reservoir 106 is illustrated as a hopper in FIG. 1. However, numerous suitable forms of the reservoir have been contemplated such as conduits, drums, pressurized containers, etc. Additionally in other examples, the system may include a plurality of reservoirs. Furthermore, the polymeric material 104 may be dried within the reservoir 106 or prior to placement of the material in the reservoir. Moreover, the polymeric material 104 may be in the form of chips, pellets, powders, rods, etc.

The polymeric material 104 includes one or more thermoplastic polymers. The one or more thermoplastic polymers may include a thermoplastic elastomer (TPE). The one or more thermoplastic polymers may include aliphatic polymers, aromatic polymers, or mixture of both. In one example, the one or more thermoplastic polymers may include homopolymers, copolymers (including terpolymers), or mixtures of both. The copolymers may be random copolymers, block copolymers, alternating copolymers, periodic copolymers, or graft copolymers, for instance. The one or more thermoplastic polymers may include olefinic homopolymers or copolymers or a mixture of olefinic homopolymers and copolymers. Examples of olefinic polymers include polyethylene (PE) and polypropylene (PP). For example, the PE may be a PE homopolymer such as a low density PE or a high density PE, a low molecular weight PE or an ultra-high molecular weight PE, a linear PE or a branched chain PE, etc. The PE may be an ethylene copolymer such as, for example, an ethylene-vinyl acetate (EVA) copolymer, an ethylene-vinyl alcohol (EVOH) copolymer, an ethylene-ethyl acrylate copolymer, an ethylene-unsaturated mono-fatty acid copolymer, etc. The one or more thermoplastic polymers may include a polyacrylate such as a polyacrylic acid, an ester of a polyacrylic acid, a polyacrylonitrile, a polyacrylic acetate, a polymethyl acrylate, a polyethyl acrylate, a polybutyl acrylate, a polymethyl methacrylate, a polyvinyl acetate, etc., including derivatives thereof, copolymers thereof, and any mixture thereof, in one example. The one or more thermoplastic polymers may include an ionomeric polymer. The ionomeric polymer may be a polycarboxylic acid or a derivative of a polycarboxylic acid, for instance. The ionomeric polymer may be a sodium salt, a magnesium salt, a potassium salt, or a salt of another metallic ion. The ionomeric polymer may be a fatty acid modified ionomeric polymer. Examples of ionomeric polymers include polystyrene sulfonate, and ethylene-methacrylic acid copolymers. The one or more thermoplastic polymers may include a polycarbonate. The one or more thermoplastic polymers may include a fluoropolymer. The one or more thermoplastic polymers may include a polysiloxane. The one or more thermoplastic polymers may include a vinyl polymer such as polyvinyl chloride (PVC), polyvinyl acetate, polyvinyl alcohol, etc. The one or more thermoplastic polymers may include a polystyrene. The polystyrene may be a styrene copolymer such as, for example, an acrylonitrile butadiene styrene (ABS), a styrene acrylonitrile (SAN), a styrene ethylene butylene styrene (SEBS), a styrene ethylene propylene styrene (SEPS), a styrene butadiene styrene (SBS), etc. The one or more thermoplastic polymers may include a polyamide (PA). The PA may be a PA 6, PA 66, PA 11, or a copolymer thereof. The polyester may be an aliphatic polyester homopolymer or copolymer such as polyglycolic acid, polylactic acid, polycaprolactone, polyhydroxybutyrate, and the like. The polyester may be a semi-aromatic copolymer such as polyethylene terephthalate (PET) or polybutylene terephthalate (PBT). The one or more thermoplastic polymers may include a polyether such as a polyethylene glycol or polypropylene glycol, including copolymers thereof. The one or more thermoplastic polymers may include a polyurethane, including an aromatic polyurethane derived from an aromatic isocyanate such as diphenylmethane diisocyanate (MDI) or toluene diisocyanate (TDI), or an aliphatic polyurethane derived from an aliphatic isocyanate such as hexamethylene diisocyanate (HDI) or isophone diisocyanate (IPDI), or a mixture of both an aromatic polyurethane and an aliphatic polyurethane.

In addition to the one or more thermoplastic polymers, the polymeric material 104 may further include a chemical blowing agent which forms a gas when heated. For example, the chemical blowing agent can be an azo compound such as adodicarbonamide, sodium bicarbonate, or an isocyanate. Optionally, in addition to the one or more thermoplastic polymers, the polymeric material 104 may further include a crosslinking agent. The crosslinking agent can be a peroxide-based crosslinking agent such as dicumyl peroxide. Optionally, in addition to the one or more thermoplastic polymers, the polymeric material 104 may further include one or more fillers such as glass fiber, powdered glass, modified or natural silica, calcium carbonate, mica, paper, wood chips, modified or natural clays, modified or unmodified synthetic clays, talc, etc.

Specifically, in one example, the polymeric material 104 may include EVA and/or thermoplastic polyurethane (TPU) and the molding system 100 may create a molded footwear component (e.g., upper, midsole, and/or outsole). However, the molding system 100 and processes described herein have far-reaching applicability to fields beyond the footwear industry such as the automotive industry, aerospace industry, packaging industry, sporting goods industry, etc. Therefore, the molding system may be designed to manufacture a wide variety of articles in any of the aforementioned fields. As described herein, an article may be any object, part, component, product, etc., used any of the aforementioned industries or in other suitable industries.

The device 102, shown in FIG. 1, includes a barrel 108 and a drive device 110 designed to adjust (e.g., rotate and/or advance and retract) a screw housed in the barrel, discussed in greater detail herein. For instance, the drive device may include a motor (e.g., electric motor) which rotates and/or axially moves a shaft coupled to the screw. The device 102 is configured to provide the polymeric material received from the reservoir 106 to downstream components 113, such as a shot tuning chamber and a mold, discussed in greater detail herein.

Heating devices 112 are also coupled to the barrel 108 and configured to heat the polymeric material in the barrel 108 to form a molten polymeric material. Specifically, the heating devices 112 are coupled to an exterior surface 114 of the barrel 108 and circumferentially surround the barrel. However, alternate configurations of the heating devices 112 have been contemplated such as heating devices that only partially surround the barrel and/or heating devices that are integrated into the barrel. The heating devices 112 may be electric heating devices, hydraulic heating devices, combinations thereof, etc. The heating devices 112 may therefore include heat exchangers, resistance heaters, heat pumps, etc. Moreover, the heating devices 112 may be controlled by the computing device 124, shown in FIG. 1, based on operating conditions (e.g., ambient temperature, barrel temperature, barrel pressure, etc.). The heating devices 112, in other examples, may be positioned in other suitable locations in the system such as the reservoir 106.

The molding system 100 may also include a blowing agent delivery assembly 116 configured to flow a blowing agent, color, etc., into the barrel 108. However, in other embodiments, the blowing agent delivery assembly may be omitted from the system when, for example, the polymer in the reservoir including a blowing agent. In one example, the blowing agent delivery assembly may be designed to inject a blowing agent into the barrel 108 through a port. However, other suitable types of blowing agents delivery assemblies have been contemplated. For instance, the blowing agent delivery assembly 116 may be integrated into the reservoir 106, may be positioned upstream of the reservoir 106, or may not be included in the system. If the blowing agent delivery assembly 116 is integrated into the reservoir 106 or is positioned upstream thereof the reservoir may include a solid polymeric material and a blowing agent.

The blowing agent delivery assembly 116 includes a blowing agent storage device 118 storing a blowing agent 120. The blowing agent may include a physical blowing agent and/or a chemical blowing agent, in some examples. Specifically, the blowing agent may include nitrogen and/or carbon dioxide, in some examples. However, other suitable blowing agents may be used such as hydrocarbons (e.g., pentane, isopentane, and/or cyclopentane), hydrochlorofluorocarbons (HCFCs), mixtures thereof, etc. Furthermore, the blowing agent stored in the blowing agent storage device 118 may be stored and/or injected into the barrel 108 as an SCF. For instance, supercritical nitrogen and/or supercritical carbon dioxide may be flowed into the barrel. However, in other examples, the blowing agent may be injected into the barrel as a gas and/or fluid and the conditions in the barrel may enable the blowing agent to achieve a supercritical state. Further, in other examples, when the blowing agent includes two substances, such as nitrogen and carbon dioxide, the blowing agent delivery assembly may include one port delivering a first substance (e.g., nitrogen) into the barrel and another port delivering a second substance (e.g., carbon dioxide) into the barrel. However, one port that delivers both substances may be used, in other instances.

The blowing agent delivery assembly 116 also include a blowing agent valve 122 coupled to the barrel 108. The blowing agent valve 122 is designed to adjust the amount of blowing agent flowing into the barrel 108. For instance, the blowing agent valve 122 may be opened/closed to allow the blowing agent to be flowed into the barrel during certain operating conditions and to prevent the blowing agent from flowing into the barrel during other operating conditions. Moreover, the blowing agent valve 122 may have a plurality of different open positions allowing the flowrate of the blowing agent delivered to the barrel 108 to be adjusted. When the blowing agent is delivered to the barrel 108 a molten SPS may be formed therein. The molten SPS may therefore include the molten polymeric material and the blowing agent dissolved therein, in one example.

FIG. 1 shows a computing device 124 included in the molding system 100. It will be appreciated that the computing device 124 may be a controller designed to adjust various aspects of the molding process. The computing device 124 includes memory 126 and a processor 128. The memory 126 may include volatile, nonvolatile, non-transitory, dynamic, static, read/write, read-only, random-access, sequential-access, location-addressable, file-addressable, and/or content-addressable devices. Additionally, the processor 128 may be a single-core or multi-core device, and the instructions executed thereon may be configured for sequential, parallel, and/or distributed processing. Although the computing device 124 is shown directly coupled to an external housing 130 of the system, the computing device 124 may be remotely located, in other instances. In such an example, the computing device 124 may be electronically (e.g., wired and/or wirelessly) connected to the device 102 and other components in the system.

The computing device 124 also includes a display device 132. The display device 132 may be used to present a visual representation of data held by the memory 126. The graphics presented on the display device 132 may take the form of a graphical user interface (GUI) and/or other suitable interfaces, for instance. The computing device 124 also includes an input device 134. In the illustrated example, the input device 134 is in the form of a keyboard. The input device may additionally or alternatively include a mouse, joystick, camera, microphone, touchscreen, combinations thereof, etc. Thus, user input may be used to adjust different aspects of the molding process, in some examples. Additionally or alternatively, automated instructions may trigger changes in the molding process. Furthermore, the display device and/or the input device may be omitted from the computing device, in other embodiments.

The computing device 124 may also include a condition indicator 133 which may indicate that the molding system 100 has reached one or more desired operating condition(s) (e.g., shot tuning chamber pressure and/or temperature set-points, mold temperature set-points, mold counter pressure set-points, combinations thereof, etc.). Thus, the condition indicator 133 may indicate to a system operator that a desired condition has been achieved such as a desired temperature of and a pressure applied to the molten polymeric material in a shot tuning chamber, discussed in greater detail herein. Responsive to the condition indicator being triggered the system operator may command the system to take a desired action via the input device 134, such as commanding the shot tuning chamber to release the molten polymeric material held therein into the mold cavity. The condition indicator 133 may include audio, graphical, and/or haptic components for alerting the system operator. The graphical indicator may be included in the display device and/or may include one or more light(s) for signaling the operator. In this way, certain aspects of the molding process may be manually controlled. However, in other examples, more automated control strategies may be utilized.

Sensors 136 may also provide signals to the computing device 124. The sensors may include temperature sensors, pressure sensors, etc. The sensors may be attached to or integrated into the device 102 and/or downstream components, described in more detail herein with regard to FIGS. 2-4. For instance, device 102 may include temperature sensor(s), pressure sensor(s), and/or combined temperature-pressure senor(s) sending signals to the computing device 124. The sensors enable the temperatures and pressures in selected sections of the system to be determined. In some examples, the temperature and/or pressure in selected sections of the system may be determined (e.g., estimated) from temperature and/or pressure sensor readings in other sections of the system.

The computing device 124 also sends and receives signals to/from the device 102, the drive device 110, the heating devices 112, and the blowing agent valve 122. The computing device 124 may also send/receive signals to/from a tuning chamber valve 202, temperature and pressure control assembly 222 (e.g., temperature control mechanism 228 (e.g., coolant pump 234, heat exchanger 236, and/or thermoelectric heater and/or cooler 238), and pressure control mechanism 225 (e.g., piston actuator 226)), adjustable mold runner 240, counter pressure valve 256, and/or blow off valve 272, discussed in greater detail herein with regard to FIGS. 2-4. Therefore, the aforementioned devices, mechanisms, valves, assemblies, etc., may receive control commands from the computing device 124. The aforementioned devices, mechanisms, valves, assemblies, etc., may include actuators facilitating adjustment of the devices, mechanisms, valves, assemblies, etc. For instance, the tuning chamber valve 202 may include a valve actuator adjusting the degree of opening/closing of the valve. It will be appreciated that the other devices, mechanisms, valves, assemblies, etc., may also include actuators functioning in a similar manner to allow adjustment of the device, mechanism, valve, assembly, etc. Additionally, instructions (e.g., code) stored in the memory 126 of the computing device may include instructions for implementing the molding methods, processes, techniques, control schemes, etc., described herein. As such, instructions may be stored in the memory 126 that cause the processor 128 to implement the actions, steps, features, etc., of the molding system described herein.

Figure 2:
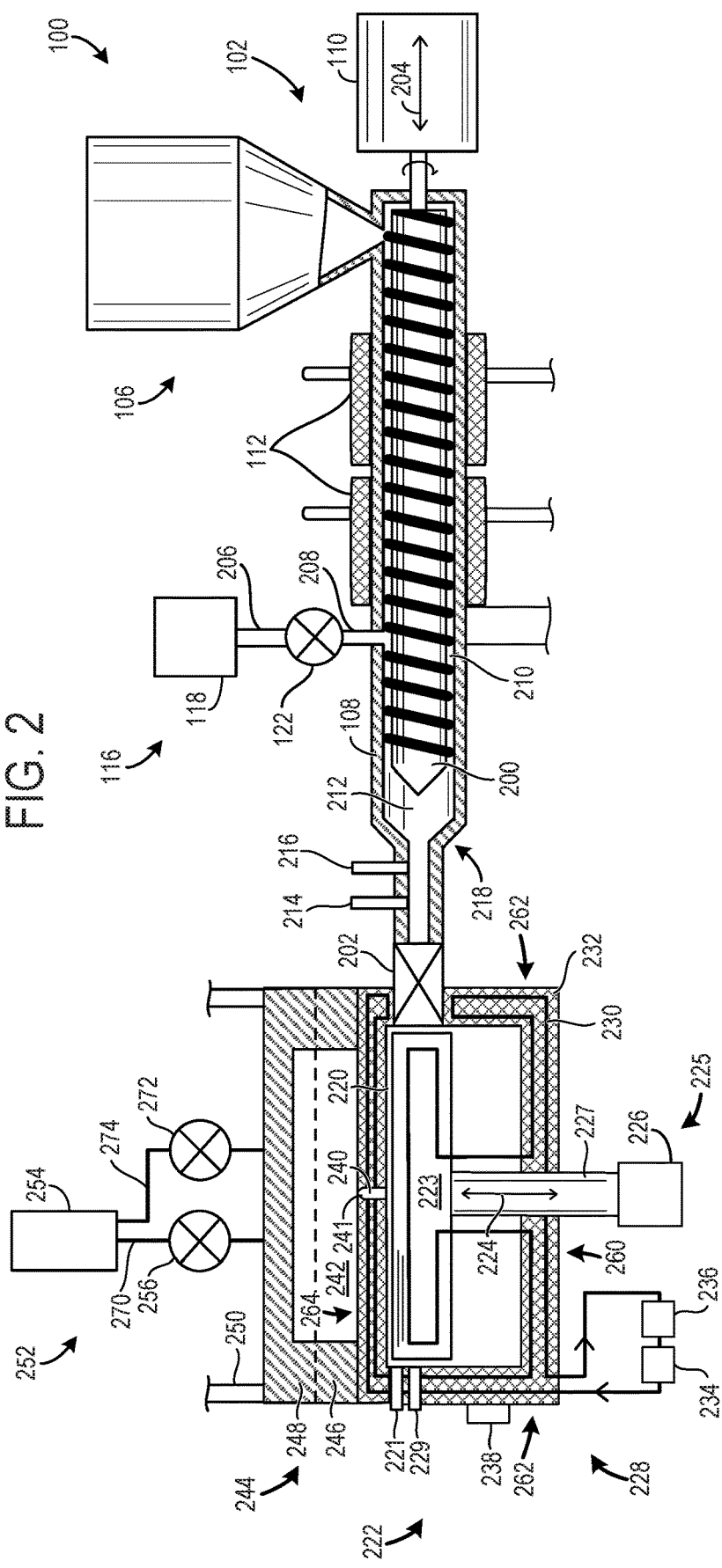
FIGS. 2-4 show a sequence for molding an article using the molding system, shown in FIG. 1.
Figure 3:
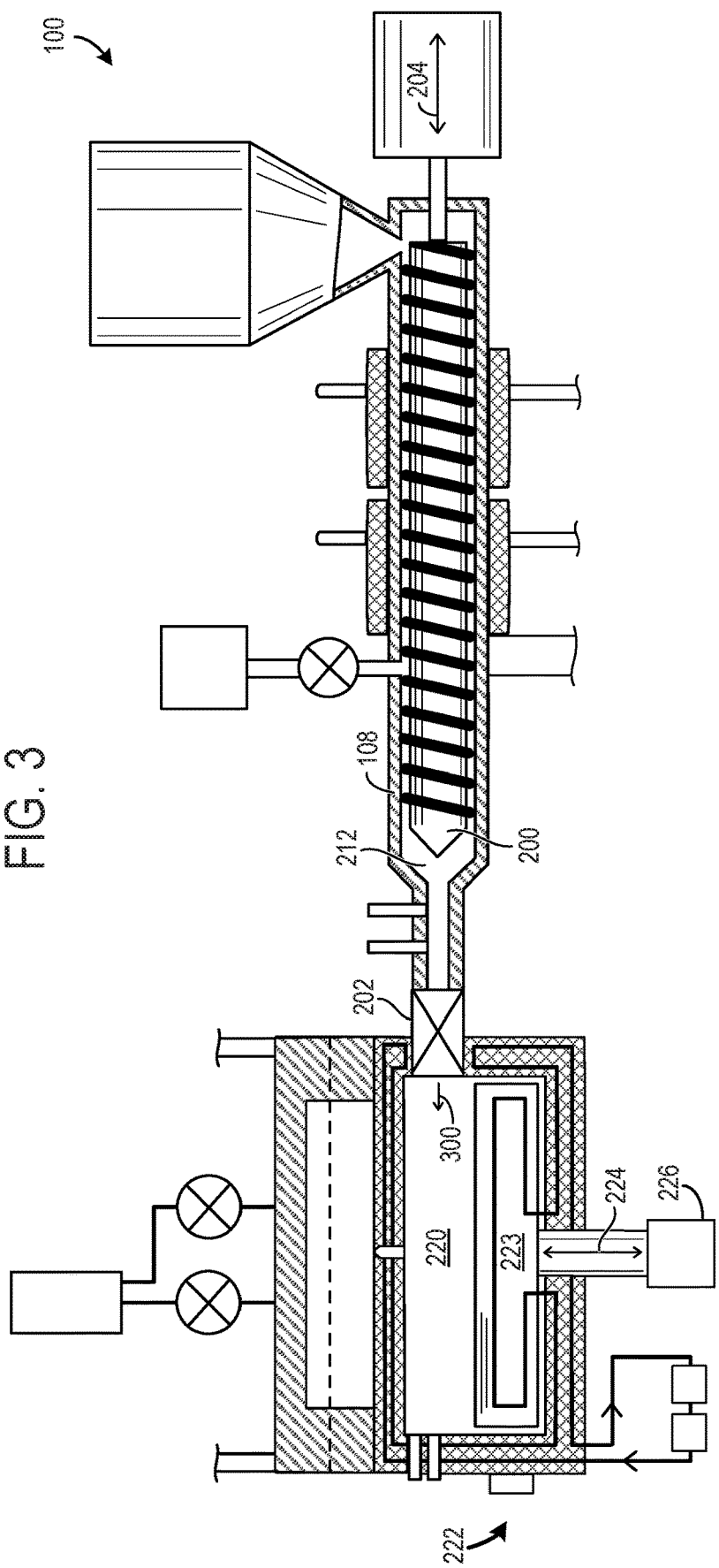
Figure 4:
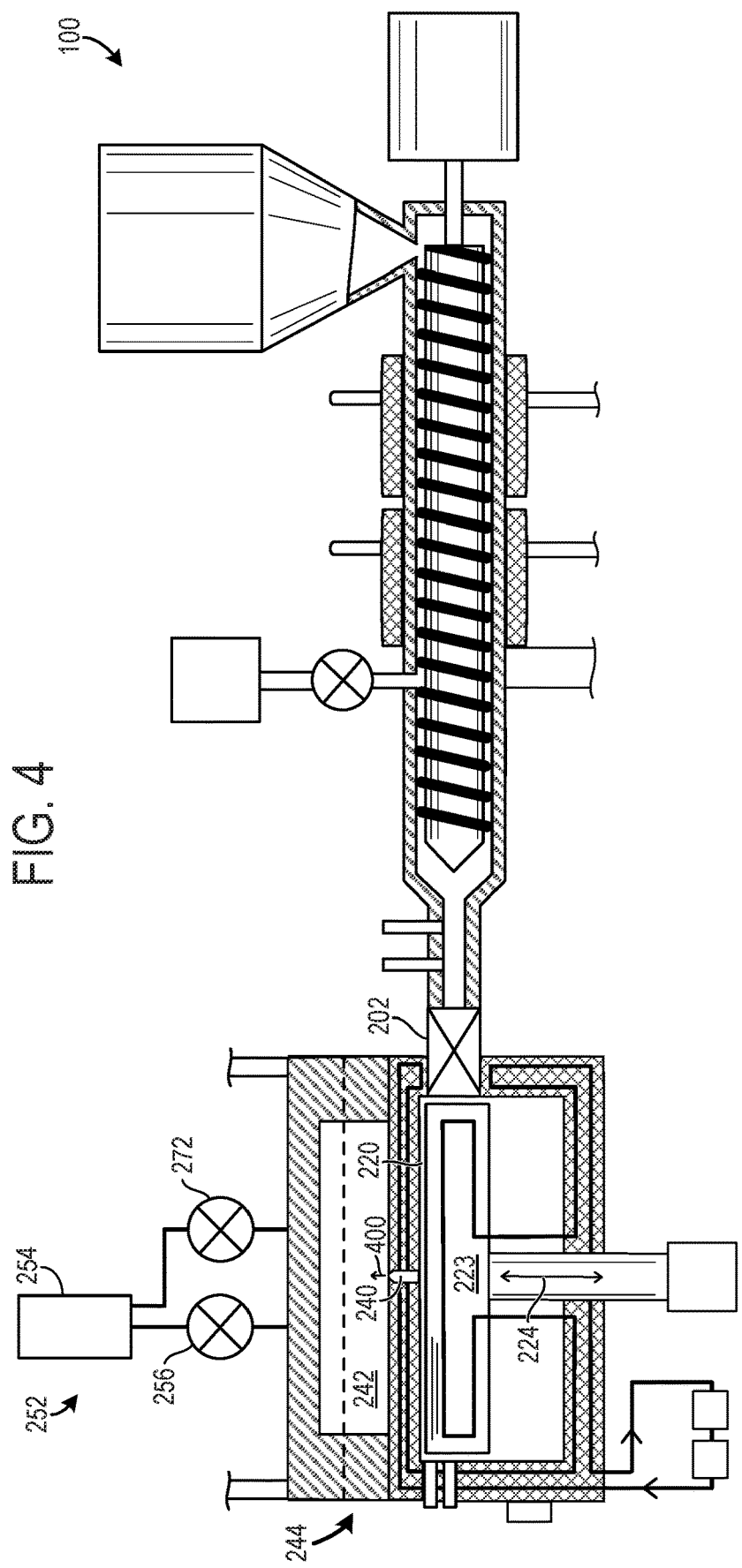

FIGS. 2-4 show a detailed view of the molding system 100. In particular, sequential steps in a molding process are illustrated in FIGS. 2-4. Referring specifically to FIG. 2, a cross-sectional view of the device 102 is depicted. The device 102 includes the barrel 108 that at least partially encloses a screw 200. The reservoir 106 is again shown coupled to the barrel 108 and provides a polymeric material thereto. The device 102 may also include the tuning chamber valve 202, in one example.

The drive device 110 (e.g., drive motor) is coupled to the screw 200. The drive device 110 is configured to rotate the screw 200 and/or advance and retract the screw in the barrel 108. Thus, the drive device may include a motor (e.g., electric motor) which provides screw adjustment functionality. Rotation of the screw causes the polymeric material to flow downstream through the barrel and advancement of the screw in the barrel toward a nozzle 218 increases the pressure of the polymeric material in front of the screw which may push the polymeric material out of the barrel when the tuning chamber valve 202 is opened. The axis 204 about which the screw rotates and advances/retracts is provided for reference. In other examples, separate actuators may be used to rotate and advance/retract the screw.

As the polymeric material moves through the barrel 108 the polymeric material may be heated via the heating devices 112 coupled to the barrel 108. It will be appreciated that the heating devices 112 may increase the temperature of the barrel 108 which in turn increases the temperature of the polymeric material. As such, a molten polymeric material may be formed in the barrel subsequent to heating of the polymeric material. As previously mentioned, the heating devices 112 may be controlled by the computing device 124, shown in FIG. 1.

The blowing agent delivery assembly 116 is also shown in FIG. 2. The blowing agent delivery assembly 116 includes the blowing agent storage device 118 and the blowing agent valve 122, as previously discussed. A blowing agent conduit 206 extends between the blowing agent valve 122 and blowing agent storage device 118. Another blowing agent conduit 208 extends between the blowing agent valve 122 and the barrel 108. Specifically, the blowing agent conduit 208 opens into an interior section 210 of the barrel 108 having the screw 200 housed therein. As previously discussed, the blowing agent may be flowed into the molten polymeric material in the barrel to form a molten SPS. The molten SPS may therefore include the molten polymeric material and a blowing agent dissolved therein, in some examples.

A section 212 of the barrel 108 downstream of the screw 200 accumulates molten polymeric material (e.g., molten SPS) during operation of the device 102. The section 212 may therefore provide a staging area housing the molten polymeric material and the blowing agent. In another example, however, the section 212 may only house the molten polymeric material. In the illustrated example, a pressure sensor 214 and a temperature sensor 216 are shown coupled to the barrel 108 downstream of the screw 200 and are in electronic communication with the computing device 124, shown in FIG. 1. However in other examples, additional or alternative suitable sensor positions have been contemplated, such as at the nozzle or locations adjacent to the screw. Still further in other examples, a single sensor may be used to measure both temperature and pressure, additional temperature and/or pressure sensors may be coupled to the barrel or other locations in the system, or the sensors may be omitted from the system.

The barrel 108 includes the nozzle 218 in fluidic communication with the tuning chamber valve 202. The tuning chamber valve 202 is configured to regulate the flow of the molten polymeric material (e.g., molten SPS) from the barrel 108 and specifically the nozzle 218 into a shot tuning chamber 220. Thus, the tuning chamber valve 202 may be set in an open position by the computing device 124, shown in FIG. 1, to allow the molten polymeric material to flow into the shot tuning chamber 220 from the device 102. The tuning chamber valve 202 may also be set in a closed position by the computing device 124 to inhibit the molten polymeric material from flowing into or out of the shot tuning chamber 220 to/from the device 102. It will be appreciated that the tuning chamber valve 202 may have a plurality of open positions. The different open positions therefore enable the flowrate of molten polymeric material into the shot tuning chamber 220 from the barrel 108 to be varied. It will also be appreciated that the shot tuning chamber 220 may be an intermediate chamber between the device 102 and the mold 244, for example. Moreover, it will be appreciated that the shot tuning chamber may be sealed from upstream and downstream components while temperature and/or pressure tuning occurs in the chamber. Additionally or alternatively, the temperature and/or pressure tuning may occur while the tuning chamber is in fluidic communication with upstream and/or downstream components.

A temperature sensor 221 and a pressure sensor 229 are coupled to (e.g., extend through) a housing 232 of the shot tuning chamber 220. Additional pressure and/or temperature sensors, in some instances, may be coupled to the housing 232 of the shot tuning chamber 220. The temperature sensor 221 and the pressure sensor 229 send sensor signals to the computing device 124 indicative of temperature and pressure in the shot tuning chamber.

The molding system 100 also includes a temperature and pressure control assembly 222 controlled by the computing device 124, shown in FIG. 1. Continuing with FIG. 2, the temperature and pressure control assembly 222 is configured to adjust the temperature of and/or pressure applied to the molten polymeric material in the shot tuning chamber 220. It will be appreciated that a temperature adjustment will affect the pressure applied to the molten polymeric material or vice versa.

The temperature and pressure control assembly 222 may include a pressure control mechanism 225 including a moveable piston 223 disposed in the shot tuning chamber 220. The moveable piston 223 is actuated by a piston shaft 227 coupled to a piston actuator 226, both of which are included in the pressure control mechanism 225. The piston 223 and shot tuning chamber 220 may have corresponding cylindrical shapes, in one example. However, numerous suitable contours of the piston and shot tuning chamber have been contemplated. The moveable piston 223 may travel along axis 224 to increase and decrease the volume of the shot tuning chamber 220. Thus, the moveable piston 223 may be adjusted to initiate molten polymeric material flow into and/or out of the shot tuning chamber 220 and may also adjust the pressure of the molten polymeric material in the shot tuning chamber 220 when the tuning chamber valve 202 and the adjustable mold runner 240 are closed. As such, the molten polymeric material may be flowed out of the shot tuning chamber at a pressure above the ambient pressure, in one example. It will be appreciated that various benefits, such as improving the surface quality of the polymeric material, may be achieved when the molten polymeric material is flowed into the mold at pressures greater than the ambient pressure.

The piston actuator 226 may be a hydraulic, pneumatic, and/or electronic actuation device. Furthermore, the piston actuator 226 may be commanded by the computing device 124, shown in FIG. 1, to adjust the position of the piston 223 in the shot tuning chamber 220 to precisely adjust the pressure applied to the molten polymeric material in the shot tuning chamber as well as enable polymeric material to flow into and out of the shot tuning chamber.

To flow the molten polymeric material from the barrel 108 into the shot tuning chamber 220 the screw 200 may be advanced and/or the piston 223 may be moved downward to increase the volume of the shot tuning chamber. In one example, these actions may occur at overlapping (e.g., simultaneous) time intervals. However, in other examples the actions may be implemented in succession. Furthermore, in other examples, downward movement of the piston 223 or advancement of the screw 200 in the barrel 108 may be implemented to flow the molten polymeric material into the shot tuning chamber from the device 102. On the other hand, to flow the molten polymeric material out of the shot tuning chamber 220 into the mold 244 the piston may be moved upward to decrease the volume of the chamber. The shot tuning chamber 220 and the moveable piston 223 may be designed to achieve molding shot pressures well above ambient pressure, if desired.

The temperature and pressure control assembly 222 may additionally or alternatively include a temperature control mechanism 228. The temperature control mechanism 228 is configured to adjust the temperature of the molten polymeric material (e.g., molten SPS) in the shot tuning chamber 220. Temperature adjustment of the molten polymeric material in the shot tuning chamber enables the molded article to achieve desired end-use characteristics (e.g., surface quality, strength to weight ratio, density uniformity, etc.,) for instance.

In one example, the temperature control mechanism 228 may include a coolant loop 230 traversing the housing 232 and/or the piston 223 of the shot tuning chamber 220. Specifically, the coolant loop 230 traverses a lower section 260, side sections 262, and an upper section 264 of the shot tuning chamber 220, in the illustrated example. However, it will be appreciated that other coolant loop paths have been contemplated such as a path traversing a portion of the aforementioned chamber housing sections, a path traversing the piston, etc.

In the illustrated example where the temperature control mechanism 228 includes the coolant loop 230, a coolant pump 234 may be coupled to the coolant loop to enable coolant to circulate there through. Specifically, the coolant pump 234 may adjust (e.g., increase/decrease) the flowrate of coolant through the coolant loop 230. A heat exchanger 236 is also coupled to the coolant loop and is designed to remove heat from the coolant. In some examples, the heat exchanger may additionally or alternatively add heat to the coolant. In such an example, coolant may be circulated through the coolant loop via the coolant pump 234 and heat may be added or removed from the coolant via the heat exchanger to facilitate temperature adjustment of the molten polymeric material in the shot tuning chamber. In this way, the shot tuning chamber may be heated as well as cooled by the temperature control mechanism 228.

The temperature control mechanism 228 may additionally or alternatively include a thermoelectric heater and/or cooler 238 (e.g., a Peltier device) that may be coupled to or integrated into the housing 232 and/or piston 223. Furthermore, the thermoelectric heater and/or cooler 238 may be designed to heat and/or cool the molten polymeric material in the shot tuning chamber, in one example. For instance, power may be supplied to a thermoelectric cooling or heating device to cool or heat the shot tuning chamber and in turn the molten polymeric material. In other examples, heat rods may, additionally or alternatively, be used to increase the temperature of the molten polymeric material. As such, the temperature control mechanism 228 enables the temperature of the molten polymeric material (e.g., molten SPS) in the shot tuning chamber 220 to be precisely controlled. The temperature and pressure tuning of the molten polymeric material may be used to reduce the likelihood of (e.g., prevent) unwanted cell nucleation and bubble growth in the shot tuning chamber 220. Consequently, desired material properties of the polymeric material may be achieved, such as elongational and shear viscosities, as well as elastic and storage moduli.

The molding system 100 also includes an adjustable mold runner 240 or plurality of runners that are coupled to the shot tuning chamber 220 and a mold cavity 242 in a mold 244. The adjustable mold runner 240 may be configured to adjust the flow of molten polymeric material from the shot tuning chamber into the mold cavity. The mold 244 may be designed to create a variety of goods, components, products, etc., and therefore may take a variety of forms including but not limited to a sole (e.g., midsole or outsole) in an article of footwear, an automotive dashboard, sporting goods, mattresses, containers, etc. The adjustable mold runner 240 is controlled by the computing device 124, shown in FIG. 1. Thus, the adjustable mold runner 240 enables the flow of the molten polymeric material from the shot tuning chamber into the mold to be controlled.

A gate 241 is provided at the end of the adjustable mold runner 240 that opens into the mold cavity 242. It will be appreciated that the mold runner 240 may have additional structural complexity than what is shown in FIG. 2. For instance, the runner may include corners, bends, etc., traversing the housing 232 of the shot tuning chamber 220 to enable the molten polymeric material to flow into the mold 244 at a desired location or multiple locations in embodiments where multiple runners are utilized.

Figure 5:
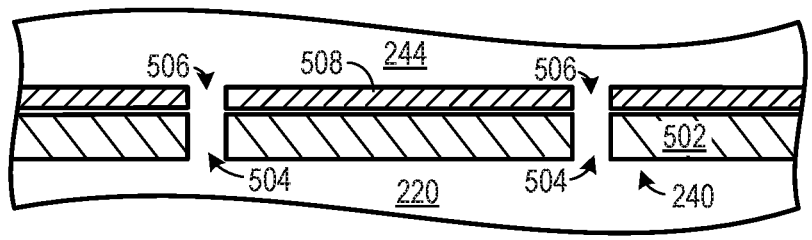
FIG. 5 shows an example of an adjustable mold runner which may be included in the molding system, shown in FIG. 1.

FIG. 5 shows a cross-sectional view of a portion of an example of an adjustable mold runner 240. The adjustable mold runner 240 is shown including a plate 502 with plate openings 504. Movement (e.g., rotation or lateral movement) of the plate 502 into an open configuration, shown in FIG. 5, aligns the plate openings 504 with mold cavity openings 506 in mold housing 508. In one example, an insulating plate may be positioned between the mold 244 and the shot tuning chamber 220. The insulation may allow further precision in temperature control to be achieved.

In a closed configuration the plate 502 may be adjusted such that the plate openings 504 are not aligned with the mold cavity openings 506. However, other suitable adjustable mold runners have been contemplated such as runners with elliptical (e.g., circular or cylindrical) configurations, hourglass configurations, rectangular configurations (e.g., square configurations), configurations with the mold opening being larger than the shot tuning chamber opening or vice versa, etc. Any of the aforementioned configurations may have draft angles (e.g., tapered inlets or outlets), in one example, or may not have draft angles, in other examples. Furthermore, aspect ratio may be used to characterize the profile of the runner. For instance, the runner may have an aspect ratio of 1:1 in the case of a circular or square profile. However, numerous suitable aspect ratios have been contemplated such as aspect ratios of 2:1, 1:2, 5:1, 1:5, 3:4, 4:3, etc.

Returning to FIG. 2, the mold 244 includes two sections (i.e., a first section 246 and a second section 248). Tie rods 250 attached to a clamping cylinder (not shown) may be attached to the second section 248 of the mold 244. The tie rods and clamping cylinder enable the mold to be opened once the article has been formed and/or cooled in the mold. However, other suitable mold configurations have been contemplated such as molds with more than two sections, molds with other types of clamping devices, etc.

The molding system 100 may also include a GCP assembly 252 configured to adjust (e.g., increase and/or decrease) the pressure in the mold 244 prior to, during, and/or after the flow of the molten polymeric material into the mold cavity 242. The GCP assembly 252 includes a gas reservoir 254 storing a pressurized gas. The gas may be air and/or nitrogen, in some examples. The GCP assembly 252 further includes the counter pressure valve 256 regulating the amount of gas flowed into the mold cavity 242 via line 270 extending between the gas reservoir 254 and the mold cavity 242. For instance, the gas in the mold cavity may be held around a target pressure (e.g., 100-2500 pounds per square inch (PSI)) during selected molding stages. Continuing with such an example, the molten polymeric material flowed into the mold cavity may be held at a correspondingly high pressure. Thus, the pressure of the molten polymeric material in the system may be held above ambient pressure during molding, if desired.

A blow off valve 272 coupled to a line 274 extending between the gas reservoir 254 and the mold cavity 242 is included in the GCP assembly 252, in the illustration. In other examples, however, the blow off valve may be integrated into the counter pressure valve 256. The blow off valve 272 allows for the release of the counter pressure in the mold cavity to be controlled. For instance, the counter pressure in the mold cavity may be released at a desired release rate(s) or the counter pressure may have a staggered release (e.g., a release, hold, and release pattern). In one example, the counter pressure valve 256 may be opened during or prior to the introduction of the molten polymeric material into the mold cavity 242. In this way, counter pressure in the mold cavity can be used to provide a controlled resistance to the flow front, pushing some of the molten polymeric material into thinner, hard to fill areas, etc., during the initial introduction of the polymeric material into the mold cavity, for instance. Counter pressure can also assist in keeping unwanted volatiles from breaking through the molten polymeric material flow to reduce surface roughness or other surface imperfections in the molded article, for example.

FIG. 3 shows a stage in the molding process when the shot tuning chamber 220 is filled with the molten polymeric material. To enable the shot tuning chamber 220 to be filled with the polymeric material the tuning chamber valve 202 is opened and/or the piston 223 may be moved such that the volume of the shot tuning chamber is increased. Arrow 300 indicates the general direction of molten polymeric material flow out of the tuning chamber valve 202 and into the shot tuning chamber 220. However, it will be appreciated that the molten polymeric material flow has additional complexity.

In the illustrated example, the piston is moved in a downward direction to enable the volume of the shot tuning chamber to be increased. Moreover, the central axis 204 of the screw 200 is perpendicular to the piston's central axis 224, in the illustrated example. However, other shot tuning chamber, piston, and/or barrel orientations may be used, in other examples. Additionally, the screw 200 may be advanced within the barrel 108 along axis 204 while the piston 223 is moved downward. Thus, molten polymeric material may be flowed from the section 212 in the barrel 108 into the shot tuning chamber 220 via actuation of the piston 223 and the screw 200. In this way, the pressure applied to the molten polymeric material entering the shot tuning chamber 220 may be precisely controlled. Moreover, after the shot tuning chamber 220 is filled with the molten polymeric material the temperature and/or pressure applied to the molten polymeric material in the shot tuning chamber may be adjusted via the temperature and pressure control assembly 222 based on operating conditions to achieve desired end-use characteristics of the article, as previously discussed. Such temperature and pressure adjustments may take place when the tuning chamber is sealed from upstream and/or downstream components, in some instances.

FIG. 4 shows a stage in the molding process when the mold cavity 242 is filled with the molten polymeric material. To allow the mold cavity to be filled with molten polymeric material the tuning chamber valve 202 may be closed, the adjustable mold runner 240 is opened, and the piston 223 may be moved such that the volume of the shot tuning chamber 220 is decreased. However, in other examples, the piston 223 may not be moved when filling the mold with the molten polymeric material. Arrow 400 indicates the general direction of molten polymeric material flow out of the adjustable mold runner 240 into the mold cavity 242.

Additionally, the piston 223, shown in FIG. 4, is at an upper position. The upper position may correspond to a position where the shot tuning chamber 220 is at or near its smallest volume. However, in other instances, the upper position of the piston 223 may simply correspond to a shot tuning chamber volume that is smaller than the shot tuning chamber volume associated with the lower piston position, shown in FIG. 3. In one example, the GCP assembly 252 may generate a counter pressure in the mold cavity 242 prior to or during the flow of molten polymeric material into the mold cavity 242. Thus, the counter pressure valve 256 may be opened to pressurize the mold cavity. As the molten polymeric material travels into the cavity, the counter pressure may be held at a substantially constant pressure or reduced to enable the polymeric material to achieve desirable physical properties in the mold 244. The GCP reduction in the mold 244 may be carried out through operation of the blow off valve 272.

Another GCP strategy may set GCP to a desired pressure setting which is achieved before introduction of the molten polymeric material into the mold. As the molten polymeric material is flowed into the mold the mold cavity pressure increases and the GCP control device may vent the GCP according to a GCP set-point (e.g., maximum GCP set-point) controlled by a directional or proportional valve, and according to a profiled release rate controlled by a proportional valve and a delay timer; or series of timers, that can delay; or pulse, the start of; and completion, of venting of the GCP, in some examples. The GCP venting may be completed once the molten polymeric material has achieved a target temperature and viscosity. Controlling GCP venting allows for control of foam cell nucleation and growth by keeping the SCF dissolved in the molten polymeric material, slowing (e.g., preventing) its expansion until the polymeric material has cooled so sufficient melt strength for foaming can occur, if desired. Different polymer rheologies may require different GCP strategies. Providing GCP in the mold cavity may produce homogeneous densities and physical properties of the molded article as well as improve surface quality of the molded article such as decreased roughness, decreased blistering, etc., for example.

In another example, the GCP assembly 252 may be operated to maintain the pressure in the mold cavity 242 at a level such that the SCF remains in solution within the molten polymeric material as the SCF-polymeric material solution enters the mold cavity. After a proportion of the total injection volume (e.g., 10%, 20%, 30%, 40%, etc.) has entered the mold cavity 242, the pressure within the mold cavity may be altered. For example, the pressure in the mold cavity 242 may be rapidly decreased through operation of the GCP assembly 252, causing the SCF to rapidly expand in volume, thereby foaming the molten polymeric material, filling the mold cavity 242 with foamed polymeric material, and rapidly cooling the foamed polymeric material. In another example, the GCP assembly 252 may be operated to maintain the pressure in the mold cavity 242 at a target level, then decrease the pressure in the mold cavity, and following the decrease in pressure again increase the pressure. Consequently, the rate of foaming of the molten polymeric material in the mold is reduced and the thickness of the skin layer formed on the exterior of the molded article is increased, if desired.

Further in one example, when the mold cavity pressure is regulated using gas in the mold cavity 242 through operation of the GCP assembly 252, the decrease in pressure within the mold cavity 242 may be caused by evacuating the gas, for example by opening the blow off valve 272 and venting the gas, to the atmosphere for instance, by pumping the gas from the mold cavity into a second chamber, or by a venting ring (not shown) on the core side of the mold which is opposite to the side with the gate 241. The rate of evacuation of the gas may be constant or may vary during the foaming process. Similarly, the pressure may increase the concentration of the gas present in the mold cavity, for example by opening the counter pressure valve 256 connected to the gas reservoir 254, or pumping gas into the mold cavity 242.

Figure 6:
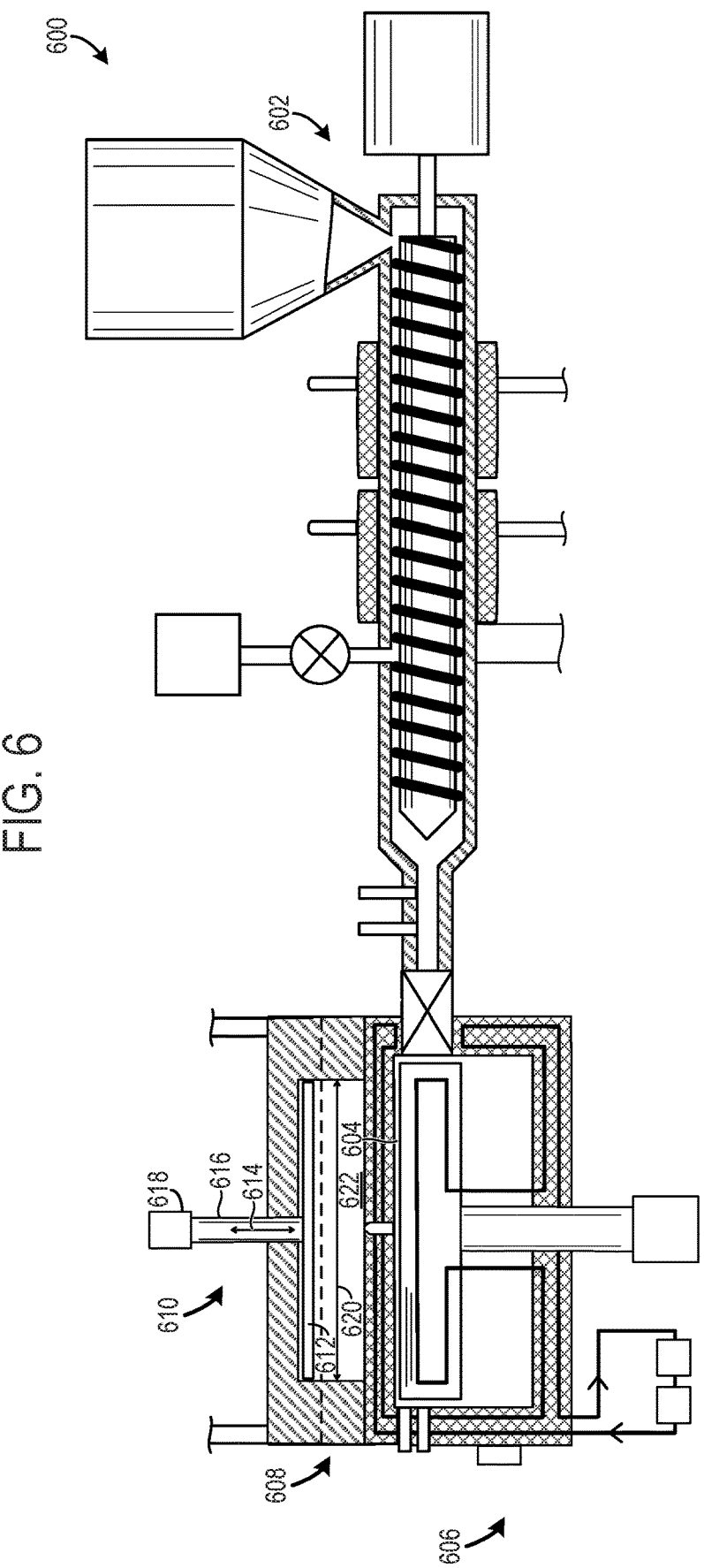
FIG. 6 shows another example of a molding system.

FIG. 6 shows another example of a molding system 600. The molding system 600, shown in FIG. 6, includes components, devices, parts, assemblies, etc., that may have similar functions, characteristics, profiles, etc., to the molding system 100, shown in FIGS. 1-5. For example, the molding system includes a device 602 (e.g., injection device), a shot tuning chamber 604, a temperature and pressure control assembly 606, a mold 608, etc. Redundant part description is therefore omitted.

The molding system 600, shown in FIG. 6, includes a mechanical pressure adjustment assembly 610 instead of the GCP assembly 252, shown in FIGS. 1-5. However, embodiments of the molding system have been envisioned with both a GCP assembly and a mechanical pressure adjustment assembly.

The mechanical pressure adjustment assembly 610 includes a moveable piston 612, in the illustrated example. However, in other examples, the mechanical pressure adjustment assembly 610 may include a plurality of moveable pistons and/or may include one or more moveable baffles that may also facilitate pressure control in the mold 608.

The movable piston 612 may be moved in opposing directions along axis 614 via a piston shaft 616 coupled to a piston actuator 618. The piston actuator 618 may be a hydraulic, pneumatic, and/or electronic actuation device. The piston actuator 618 may be commanded by a computing device, such as the computing device 124 shown in FIG. 1, or another suitable computing device to adjust the position of the piston 612 in the mold 608 to precisely adjust the pressure of the polymeric material in the mold. As shown in FIG. 6, the piston 612 extends across a width 620 of a mold cavity 622. However, other piston contours have been contemplated.

It will be appreciated that when mechanical methods are used to regulate the pressure within the mold cavity 622, the volume of the mold cavity may be adjusted. For example, the volume of the mold cavity 622 may be increased by moving the piston 612 toward the top of the mold cavity. In other examples, the position of a plurality of pistons and/or one or more baffles may be altered to adjust mold cavity volume. For instance, the one or more baffles may be removed from the mold cavity. Using mechanical methods to regulate mold cavity pressure makes it possible to decrease the pressure in a step-wise manner or at a constant and in some cases rapid rate during the foaming process, for instance. Similarly, the volume of the mold cavity 622 can be decreased by moving the piston 612 downward in the mold cavity and/or by inserting a baffle into the mold cavity. As such, the foaming process may happen by controlled and in some cases rapid movement of the piston and/or baffles.

Varying the rate at which the pressure is decreased or increased in the mold cavity 622, or the other mold cavities described herein, makes it possible to vary the rate at which the molten polymeric material foams in the mold cavity. For example, decreasing the pressure in a step-wise manner makes it possible to control the rate of foaming in a step-wise manner, if desired. Furthermore, controlling the rate of foaming by controlling the pressure within the mold cavity may be used to create a foamed article having a foam density gradient throughout the article or having zones with different average foam densities. Alternatively, the pressure within the mold cavity may be adjusted based on the temperature of the molten polymeric material as it foams, in order to maintain the rate of foaming at a constant rate as the temperature within the mold cavity increases or decreases.

Figure 7:
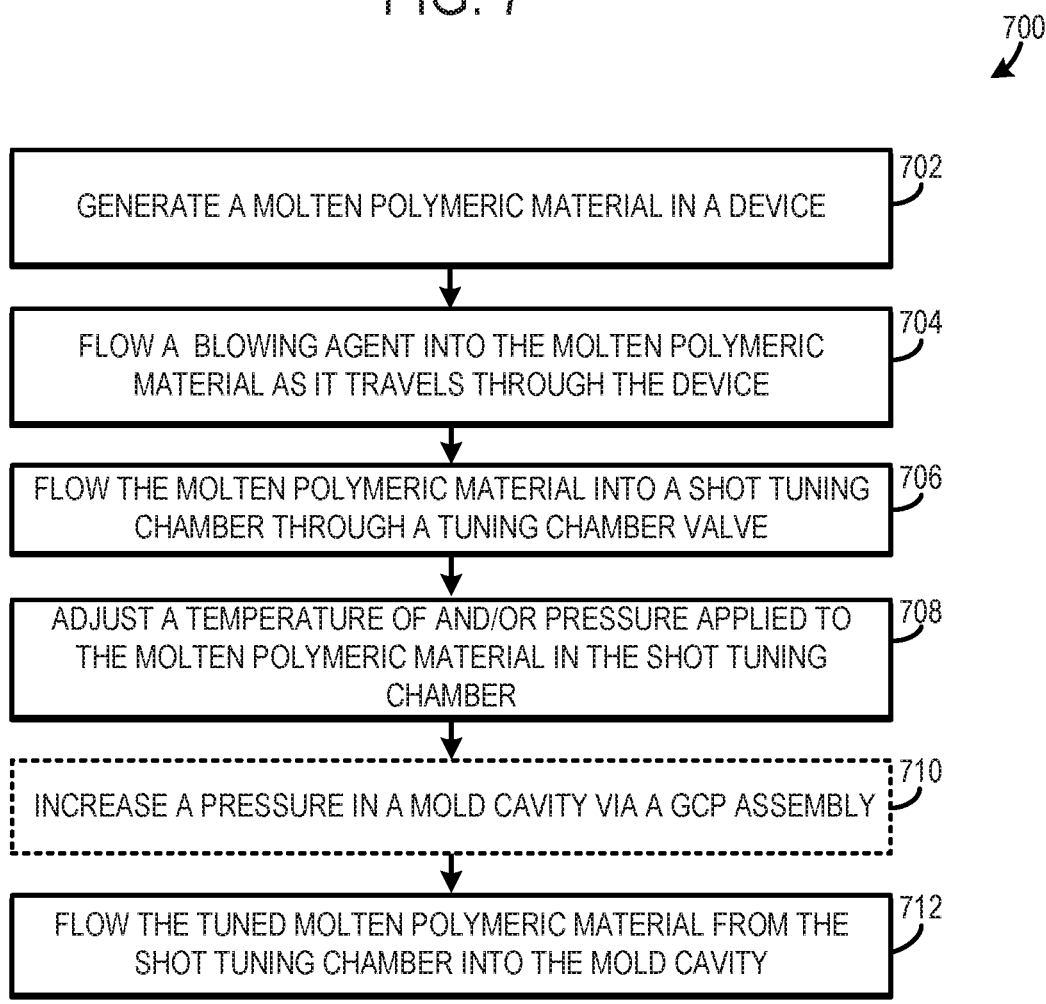
FIG. 7 shows a method for operating a molding system.

FIG. 7 shows a method 700 for operation of a molding system. Method 700 as well as the other methods described herein may be implemented by the molding systems, components, devices, etc., described herein with regard to FIGS. 1-6. However, in other examples, the method 700 and/or the other methods described herein may be implemented by other suitable molding systems, components, devices, etc.

At 702 the method includes generating a molten polymeric material in a device. For instance, heating devices coupled or integrated into a barrel of the device may be activated to heat a polymeric material to create the molten polymeric material.

At 704 the method includes flowing a blowing agent via a blowing agent delivery assembly into the molten polymeric material as it travels through the device (e.g., an injection device or an extrusion device). In one example, a molten SPS may be formed when the blowing agent is flowed into the molten polymeric material. In one example, the blowing agent may be a physical blowing agent such as carbon dioxide and/or nitrogen which may be in a supercritical state, for instance. However, in other examples, the blowing agent may be a chemical blowing agent. Further, in one example, the method may further includes dissolving the blowing agent into the molten polymeric material.

At 706 the method includes flowing the molten polymeric material into a shot tuning chamber from the device. In one example, the size of the shot tuning chamber may be increased or decreased by the piston and/or the screw in the barrel may be advanced while the tuning chamber valve is opened to enable the flow of the molten polymeric material into the shot tuning chamber from the device. However, in other examples, flowing the molten polymeric material may include adjusting an extrusion device.

Next at 708 the method includes adjusting a temperature of and/or a pressure applied to the molten polymeric material in the shot tuning chamber to create a tuned molten polymeric material. The temperature and/or pressure adjustment may occur by operating a temperature and pressure control assembly coupled to the shot tuning chamber. For instance, the temperature of the polymeric material may be decreased via an increase in coolant flow through a coolant loop to increase the shear and/or extensional viscosities of the molten polymeric material. Consequently, nucleation and bubble growth in the molten polymeric material may be retarded to achieve desired viscosities and/or moduli. Further, in one example, the temperature of the molten polymeric material may be adjusted to decrease pressure losses in the system, thereby increasing system efficiency. Further, in one example, the pressure applied to the molten polymeric material may be increased via operation of a piston in the shot tuning chamber to reduce the likelihood of unwanted nucleation occurring in the shot tuning chamber. It will also be appreciated that the shot tuning chamber may be sealed during the temperature and/or pressure adjustment, in some examples.

In other examples, step 708 may include actively adjusting (e.g., actively increasing or decreasing) the melt strength of the molten polymeric material (e.g., molten SPS) in the shot tuning chamber by adjusting the temperature of the molten polymeric material and/or applying the pressure to the molten polymeric material via a temperature and pressure control assembly. Specifically, in one example, the melt strength of the molten polymeric material may be increased. Melt strength may be defined as the resistance of the molten polymeric material to stretching. Therefore, in one example, melt strength may be a measure of shear viscosity, elongational viscosity, and/or modulus. In one specific example, an adjustment in melt strength is said to occur when one or more of the shear viscosity, elongational viscosity, and/or modulus of the polymeric material changes by a threshold amount (e.g., 0.1%, 0.5%, 1.0%, 1.5%, 2.0%, etc.).

At 710 the method may include increasing a pressure in a mold cavity via a GCP assembly. However, in other examples, GCP may not be used in the molding process and step 708 may therefore be omitted. Still further, in other examples, a mechanical pressure adjustment assembly may be used to increase the mold cavity pressure. It will be appreciated that the pressure in the mold cavity may be adjusted prior to or during the flow of the tuned molten polymeric material into the mold.

At 712 the method includes flowing the tuned molten polymeric material from the shot tuning chamber into the mold cavity through an adjustable mold runner. Specifically, in one example, when the molten polymeric material reaches a pressure and/or temperature set-point the shot tuning chamber may be unsealed and the tuned molten polymeric material may be flowed into the mold. Further, in one example, the piston may be moved to decrease the size of the shot tuning chamber to enable the molten polymeric material to flow from the shot tuning chamber into the mold cavity at a desired temperature and/or pressure. Additionally, the counter pressure in the mold may be released subsequent to the flow of the tuned molten polymeric material into the mold from the shot tuning chamber.

Method 700 allows for deliberate adjustments in the molten polymeric material's temperature and/or the pressure applied to the molten polymeric material before and/or while it is introduced into the mold to improve properties of the molded polymer article. For instance, the molten polymeric material's temperature and/or the pressure applied to the molten polymeric material may be adjusted to affect the bubble growth and nucleation of the foam in the mold to increase the article's strength to weight ratio, surface quality, etc.

Figure 8:
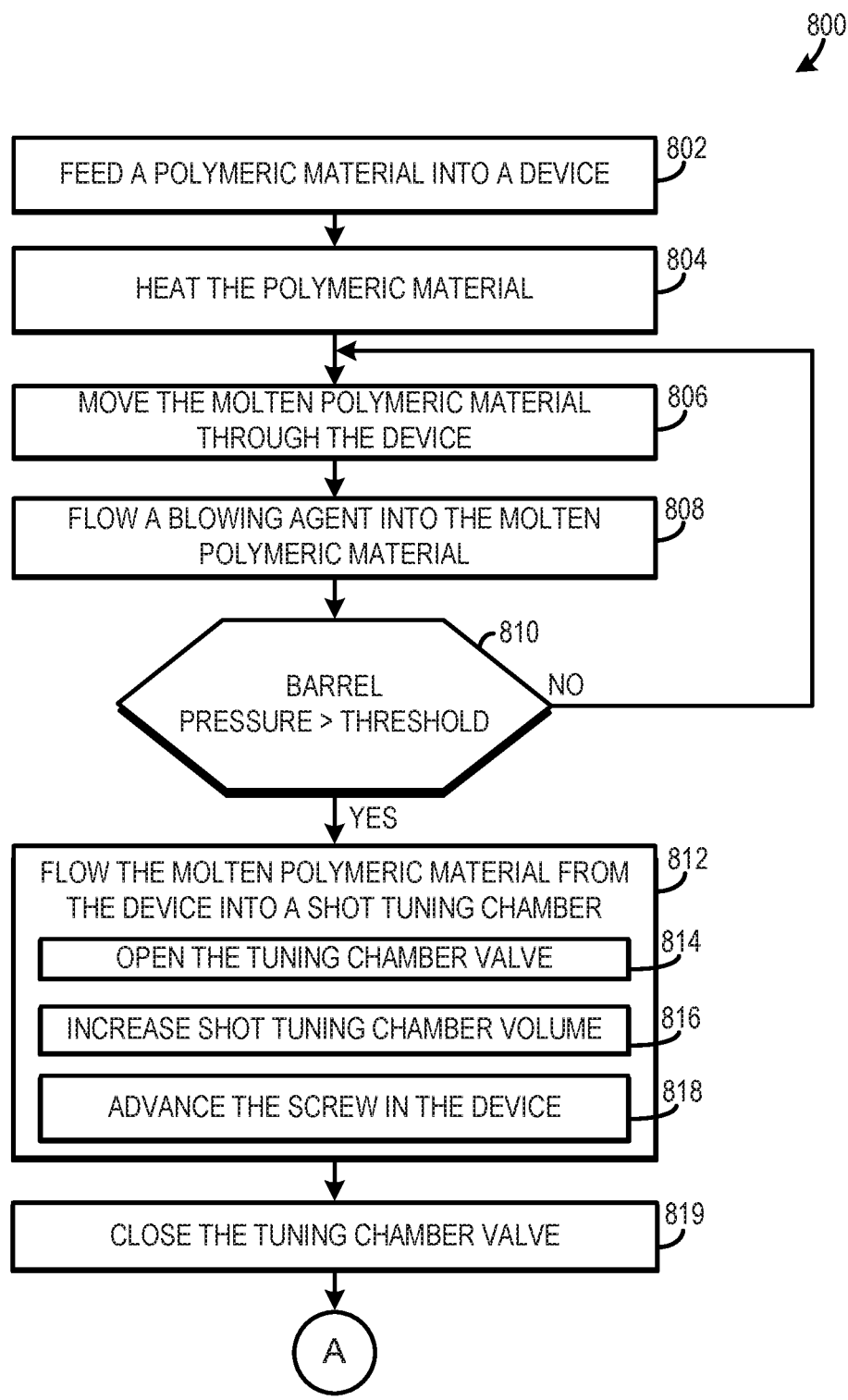
FIGS. 8 and 9 show another method for operating a molding system.
Figure 9:
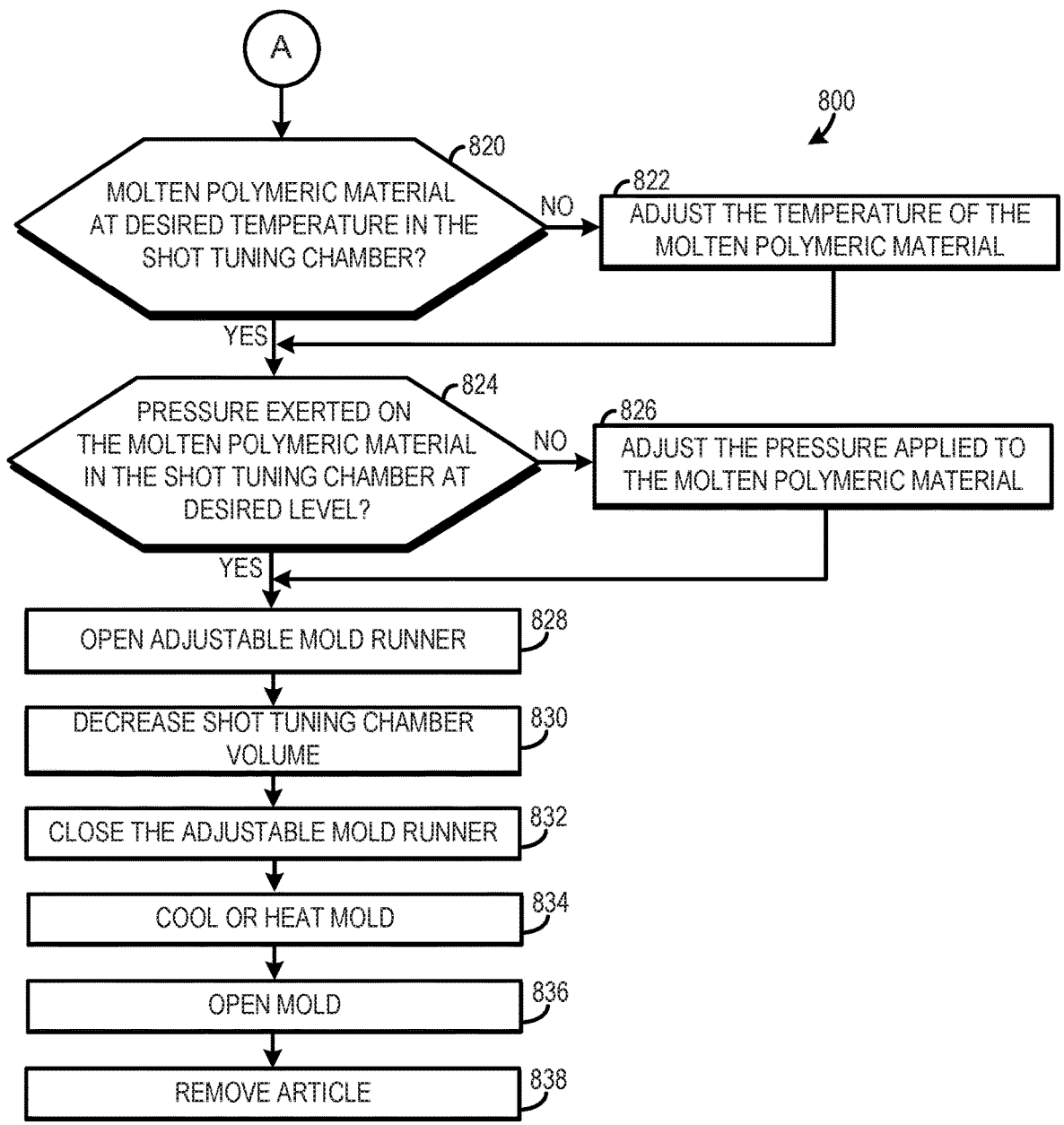

FIGS. 8-9 show another method 800 for operation of a molding system. Turning to FIG. 8, at 802 the method includes feeding a polymeric material into a device (e.g., an injection device or an extrusion device). For instance, pellets, chips, etc., may be fed from a reservoir into a barrel of the device.

Next at 804 the method includes heating the polymeric material in the device to form a molten polymeric material by operating heating devices coupled to the barrel. At 806 the method includes moving the molten polymeric material through the device. For instance, the screw enclosed in the barrel may be rotated and/or moved forward to progress the molten polymeric material through the barrel. Therefore, step 806 may also include shearing the polymeric material through operation of the screw.

Next at 808 the method includes flowing a blowing agent into the molten polymeric material as it travels through the device. The blowing agent may include a physical and/or chemical blowing agent, as previously discussed. Specifically, in one example, the blowing agent may be an SCF such as supercritical nitrogen and/or carbon dioxide. Further, in one example, the method may include dissolving the blowing agent into the molten polymeric material. In this way, in one example, a molten SPS may be formed in the barrel. However, in other examples, the barrel may include just the molten polymeric material. Further in other examples, the blowing agent may be introduced into the polymeric material upstream of the device.

At 810 the method includes determining if the barrel has surpassed a threshold pressure and/or the screw has reached a desired position. The threshold pressure and/or screw position may correspond to a threshold amount (e.g., shot size) of molten polymeric material that is desired for molding a product.

If it is determined that the barrel has not surpassed the threshold pressure and/or the screw has not reached the desired position (NO at 810) the method returns to step 806. On the other hand, if it is determined that the barrel has surpassed the threshold pressure and/or the screw has reached the desired position (YES at 810) the method advances to 812. At 812 the method includes flowing the molten polymeric material (e.g., molten SPS) from the device into a shot tuning chamber. Flowing the molten polymeric material from the device into the shot tuning chamber may include one or more of steps 814-818. At 814 the method includes opening the tuning chamber valve. At 816 the method includes increasing the shot tuning chamber volume. For instance, the piston in the shot tuning chamber may be moved downward such that the volume of the shot tuning chamber is increased. At 818 the method includes advancing the screw in the device. For example, the drive device in the device may move the screw in a direction toward the end of the barrel. It will be appreciated that steps 814-818 may be implemented at overlapping and in some cases simultaneous time intervals. However, in other examples, steps 814-818 may be successively implemented.

At 819 the method includes closing the tuning chamber valve. Therefore, in one example, the tuning chamber may be substantially sealed to facilitate temperature and/or pressure adjustment of the molten polymeric material in the tuning chamber. In this way, the shot tuning chamber may be sealed from upstream and downstream components. It will be appreciated that in other examples, the tuning chamber valve may be closed at other times, such as subsequent to step 820 or 824.

Turning to FIG. 9, at 820 the method includes determining if the molten polymeric material is at a desired temperature or within a desired temperature range in the shot tuning chamber. If the molten polymeric material is not at the desired temperature or in the desired temperature range in the shot tuning chamber (NO at 820) the method advances to 822. At 822 the method includes adjusting the temperature of the molten polymeric material in the shot tuning chamber. The temperature of the molten polymeric material may be adjusted through operation of a temperature control mechanism in the temperature and pressure control assembly. For instance, coolant circulation in a coolant loop may be increased to decrease a temperature of the molten polymeric material or heaters coupled to the tuning chamber may be activated to increase polymeric material temperature. Specifically in one example, the temperature of the molten polymeric material may be adjusted to decrease losses in the system and/or to enable the polymeric material to achieve desired properties, as previously discussed.

However, if the molten polymeric material is at the desired temperature or within the desired temperature range in the shot tuning chamber (YES at 820) the method advances to 824. At 824 the method includes determining if the pressure exerted on the molten polymeric material in the shot tuning chamber is at a desired level or within a desired range.

If the pressure exerted on the molten polymeric material in the shot tuning chamber is not at the desired level or within the desired range (NO at 824) the method advances to 826 where the method includes adjusting the pressure exerted on the molten polymeric material in the shot tuning chamber via adjustment of the piston, for example. Thus, the piston may be moved up to increase the pressure exerted on the molten polymeric material and moved down to decrease the pressure exerted on the molten polymeric material or vice versa. It will be appreciated that adjusting the temperature of and/or the pressure exerted on the molten polymeric material in the shot tuning chamber generates a tuned molten polymeric material.

On the other hand, if the pressure exerted on the molten polymeric material in the shot tuning chamber is at the desired level or within the desired range (YES at 824) the method advances to 828. At 828 the method includes opening the adjustable mold runner and at 830 the method includes decreasing the volume of the shot tuning chamber to allow the tuned polymeric material to flow from the shot tuning chamber into the mold cavity. For instance, the adjustable mold runner may be moved (e.g., rotated or moved laterally) to be placed in an open configuration and the piston in the shot tuning chamber may be moved upward to decrease the chamber's volume to initiate the flow of the tuned molten polymeric material into the mold cavity from the shot tuning chamber at a desired pressure and/or temperature. In this way, the temperature and/or pressure controlled molten polymeric material may be introduced into the mold cavity. Next at 832 the method includes closing the adjustable mold runner. At 834 the method may include cooling or heating the mold, releasing of the counter pressure in the mold, and at 836 the method includes opening the mold. At 838 the method includes removing the article from the mold. Method 800 enables precise adjustment in the temperature of and/or pressure applied to the molten polymeric material before it is introduced into the mold allowing for the fine-tuning of various properties of the article such as bubble size, bubble distribution, skin thickness, etc. Consequently, the molding process may be accurately controlled to mold articles with targeted characteristics.

Figure 10:
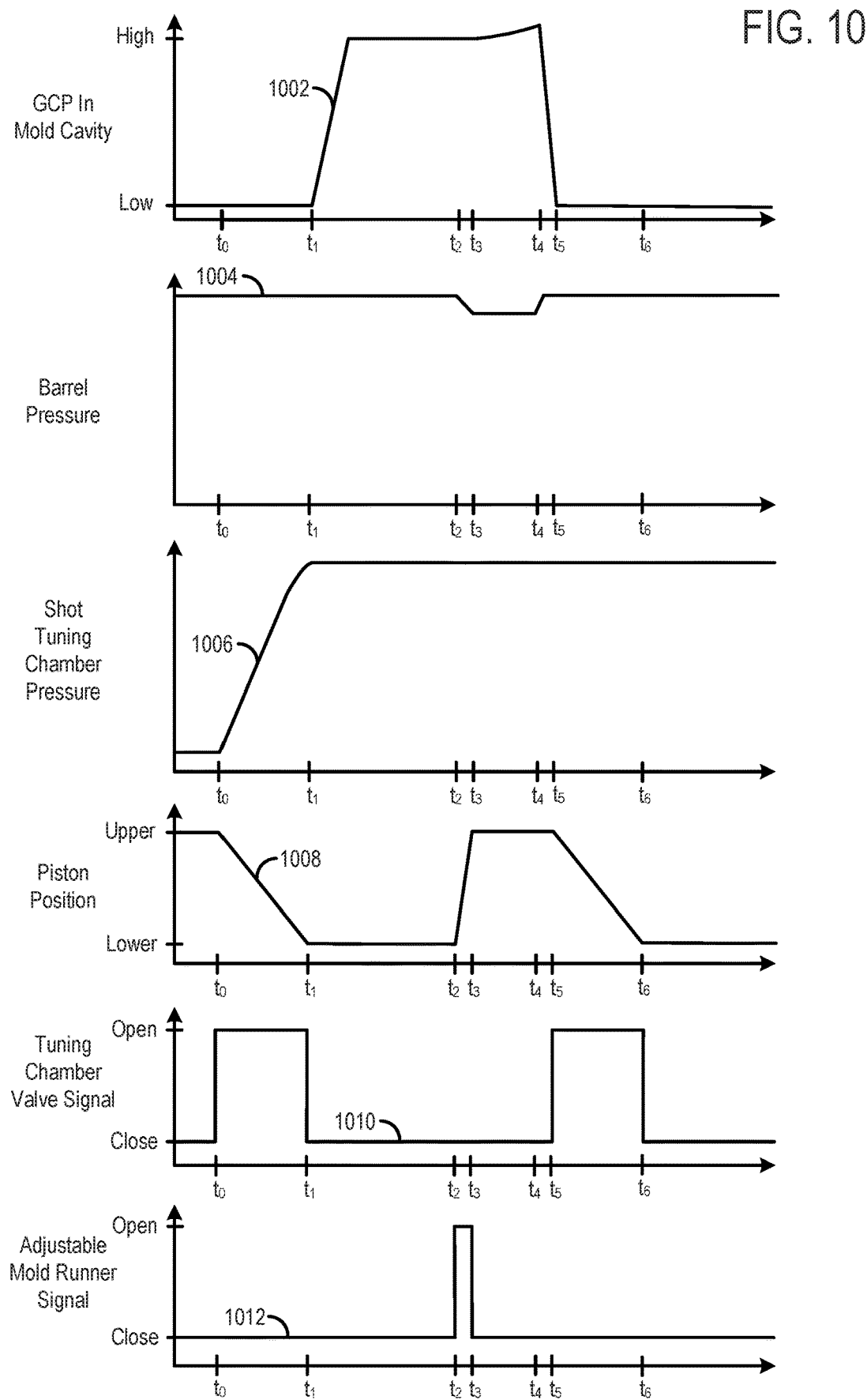
FIG. 10 shows graphs depicting pressure curves, piston position, and control signals during a molding process.

FIG. 10 depicts pressure graphs, a piston position graph, and control signal graphs during an example molding process. The molding process may be carried out by one or more of the molding systems described above with regard to FIGS. 1-6 or may be implemented by other suitable molding systems. The example of FIG. 10 is drawn substantially to scale, even though each and every point is not labeled with numerical values. As such, relative differences in timings can be estimated by the drawing dimensions. However, other relative timings may be used, if desired. Furthermore, in each of the graphs time is represented on the abscissa. Additionally, the graphical control strategy of FIG. 10 is illustrated as a use case example and that numerous molding system control strategies have been contemplated.

Specifically, Curve 1002 illustrates a GCP plot indicating the counter pressure delivered to the mold cavity via a GCP assembly. Curve 1004 depicts a pressure plot for a pressure in the barrel (e.g., a pressure in the barrel nozzle and/or in an upstream section of the barrel surrounding the screw). Specifically, in one example the pressure plot 1004 indicates a pressure value when the pressure in the barrel in front of the screw is equalized with the pressure in a section of the barrel surrounding the screw. It will be appreciated that the screw position in the barrel may vary the magnitude of the pressure plot 1004. Curve 1006 is a pressure plot indicating the pressure in the shot tuning chamber.

Curve 1008 depicts a piston position plot. The upper value on the ordinate may indicate a piston position where the volume of the shot tuning chamber is at or near its smallest volume and the lower value on the ordinate may indicate a piston position where the volume of the shot tuning chamber is at or near its largest volume.

Graph 1010 depicts a control signal that is sent to the tuning chamber valve. An open and a close value are indicated on the ordinate. The open value corresponds to a valve control signal commanding valve opening to allow the molten polymeric material to flow from the device into the shot tuning chamber. On the other hand, the close value corresponds to a valve control signal commanding valve closure to prevent the flow of molten polymeric material from the device into the shot tuning chamber or to prevent the flow of the molten polymeric material from the shot tuning chamber from flowing into the device. Although, the graph 1010 only shows an open signal and a close signal it will be appreciated that the tuning chamber valve may have a plurality of open positions that allow for a variance in flowrates of the molten polymeric material entering the shot tuning chamber.

Graph 1012 depicts a control signal that is sent to the adjustable mold runner. An open and a close value are indicated on the ordinate. The open value corresponds to a valve control signal commanding runner opening to allow the flow of molten polymeric material from the shot tuning chamber into the mold cavity. On the other hand, the close value corresponds to a runner control signal commanding runner closure to prevent the flow of molten polymeric material from the shot tuning chamber into the mold cavity. Although, the graph 1012 only shows an open signal and a close signal it will be appreciated that the adjustable mold runner may have a plurality of open positions that allow flowrate adjustments of the molten polymeric material entering the mold cavity.

At $t_0$ the tuning chamber valve is opened and the screw is advanced in the barrel. Additionally, at $t_0$ the piston is moved to a lower position. In this way, the volume of the shot tuning chamber is increased. Furthermore, at $t_0$ the mold may be closed. Mold closure may occur when a plurality of articles are successively molded by the molding system and the mold remains open after the article is removed from the mold. Opening the tuning chamber valve, advancing the screw, and moving the piston to the lower position enables the molten polymeric material to flow from the device to the shot tuning chamber. It will be appreciated that it may be desirable to increase the slope of the curve 1006 to decrease pressure losses in the system.

At $t_1$ the piston reaches the lower position. Additionally, at $t_1$ the tuning chamber valve is closed and the mold cavity is pressurized via the GCP assembly. Although plot 1006 shows the shot tuning chamber pressure level off after $t_1$ it will be appreciated that the pressure applied to the molten polymeric material in the shot tuning chamber may be tuned at $t_1$ based on operating conditions in the system. Such pressure tuning may be carried out via the pressure control mechanism in the temperature and pressure control assembly. For instance, the tuning chamber pressure may be increased to reduce the likelihood of unwanted nucleation in the molten polymeric material. However, in other examples, the tuning chamber pressure may be decreased at $t_1$. It will also be appreciated that other pressure variations in the shot tuning chamber may occur between $t_0$ and $t_6$ that are not illustrated in FIG. 10. Furthermore, at $t_1$ the temperature in the shot tuning chamber may also be tuned (e.g., increased or decreased) based on operating conditions to achieve desired polymeric material properties.

At $t_2$ the adjustable mold runner is opened and the piston is moved to an upper position, decreasing the volume of the shot tuning chamber, to allow molten polymeric material to flow from the shot tuning chamber into the mold cavity. Additionally, at $t_2$ the screw may be retracted in the barrel which decreases the barrel pressure. However, in other examples, the screw may not be retracted and/or the barrel pressure may not drop.

Next at $t_3$ the mold runner is closed. In the illustrated example, the GCP is not released at $t_3$. Consequently, the pressure in the mold cavity is increased due to the addition of polymeric material in the mold cavity. However, control scenarios where the GCP is released at $t_3$ have been contemplated.

At $t_4$ the GCP is released. Release of the GCP provides another level of control over foaming of the polymeric material in the mold to achieve desired physical and mechanical properties of the molded article. Next at $t_5$, the mold is opened and the article may be removed from the mold.

It will be appreciated that the molding process may be repeated to generate a plurality of articles from the mold, if desired. In such an example, the time interval to mold one article is referred to as a cycle time. It will be appreciated that due to the temperature and/or pressure control of the molten polymeric material the cycle time may be reduced, if desired. For example, the molten polymeric material may be at a lower temperature when entering the mold when compared to previous molding techniques. As a result, article cooling times are reduced, thereby reducing cycle time. However, in other examples the polymeric material may be at a higher temperature than previous molding processes. Continuing with such an example, after $t_4$ the pressure in the barrel is increased in anticipation of a subsequent molding cycle.

Additionally, between $t_5$ and $t_6$, the piston is again moved downward to increase the volume of the shot tuning chamber and the tuning chamber valve is opened. Furthermore, between $t_5$ and $t_6$, the screw may be advanced in the barrel to facilitate molten polymeric material flow from the device into the shot tuning chamber. It will be appreciated that the second molding cycle may unfold using similar control techniques to those described with regard to the first molding cycle occurring from $t_0$ to $t_5$.

The invention will further be described in the following paragraphs. In one aspect, a system is provided that includes a shot tuning chamber configured to receive a molten polymeric material from an upstream device, to adjust one or more of a temperature of and a pressure applied to the molten polymeric material to create an adjusted molten polymeric material, and to dispense the temperature/pressure adjusted molten polymeric material.

In another aspect, a method for operation of a molding system is provided. The method includes flowing a molten polymeric material into a shot tuning chamber from an upstream device, adjusting a temperature, a pressure, or both, within the shot tuning chamber to create a tuned molten polymeric material, and flowing the tuned molten polymeric material into a mold cavity from the shot tuning chamber. The method may further include adjusting a pressure within the mold cavity prior to or during the flow of the tuned molten polymeric material from the shot tuning chamber into the mold cavity via a GCP assembly and/or a mechanical pressure adjustment assembly coupled to the mold cavity.

In another aspect, a molding system is provided that includes a device configured to receive a polymeric material and heat the polymeric material to form a molten polymeric material, a shot tuning chamber configured to receive the molten polymeric material from the device and adjust a temperature of and/or a pressure applied to the molten polymeric material, and an adjustable mold runner configured to regulate flow of the molten polymeric material between the shot tuning chamber and a mold cavity.

In another aspect, a method for operation of a molding system is provided. The method includes forming a molten polymeric material in a device, flowing the molten polymeric material into a shot tuning chamber from the device, adjusting a temperature, a pressure, or both, within the shot tuning chamber to form a tuned molten polymeric material that has an altered melt strength, and flowing the tuned molten polymeric material from the shot tuning chamber into a mold cavity. The method may further include increasing a pressure in the mold cavity prior to or during the flow of the tuned molten polymeric material from the shot tuning chamber into the mold cavity via a GCP assembly. The method may further include dissolving the blowing agent in the molten polymeric material, forming a molten single phase solution (SPS). The method may also include moving the moveable piston to increase a volume of the shot tuning chamber while flowing the molten polymeric material into the shot tuning chamber. The method may also include flowing a blowing agent into the molten polymeric material in the upstream device.

In another aspect, a method for operation of a molding system is provided. The method includes actively adjusting a melt strength of a molten polymeric material in an intermediate chamber by applying a controlled pressure to the molten polymeric material and/or adjusting a temperature of the molten polymeric material. The method may further include, prior to applying the controlled pressure to and/or adjusting the temperature of the molten polymeric material, sealing the intermediate chamber from upstream and downstream components. The method may further include, when the molten polymeric material reaches a pressure and temperature set-point unsealing the intermediate chamber and flowing the molten polymeric material into a mold.

In any of the aspects or combinations of the aspects, the upstream device may be an injection device or an extrusion device, the injection device or the extrusion device is included in the system, and the temperature of and/or the pressure applied to the molten polymeric material is adjusted independent of the injection device or the extrusion device.

In any of the aspects or combinations of the aspects, the upstream device may be an injection device including a tuning chamber valve and a barrel housing a screw and is configured to receive the molten polymeric material and to adjust a position of the screw in the barrel and to adjust the tuning chamber valve to regulate a flowrate of the molten polymeric material into the shot tuning chamber from the injection device.

In any of the aspects or combinations of the aspects, the upstream device may be an injection device including a tuning chamber valve and a barrel housing a screw and is configured to receive the molten polymeric material and to adjust a position of the screw in the barrel and to adjust the tuning chamber valve to regulate a flowrate of the molten polymeric material into the shot tuning chamber from the injection device.

In any of the aspects or combinations of the aspects, the upstream device may be configured to receive a blowing agent from a blowing agent delivery assembly and form a molten SPS of the blowing agent dissolved in the molten polymeric material.

In any of the aspects or combinations of the aspects, the blowing agent may include a physical blowing agent or a chemical blowing agent.

In any of the aspects or combinations of the aspects, the physical blowing agent may be an SCF.

In any of the aspects or combinations of the aspects, the system may further include an adjustable mold runner configured to regulate fluidic communication between the shot tuning chamber and a mold cavity in a mold.

In any of the aspects or combinations of the aspects, the adjustable mold runner may include a plate with a plate opening and where movement of the plate into an open configuration aligns the plate opening with a mold cavity opening in the mold.

In any of the aspects or combinations of the aspects, adjusting the temperature of the molten polymeric material may include decreasing the temperature of the molten polymeric material.

In any of the aspects or combinations of the aspects, the system may further include a GCP assembly coupled to a mold cavity and configured to regulate an amount of counter pressure gas flow into and out of the mold cavity.

In any of the aspects or combinations of the aspects, the system may further include a mechanical pressure adjustment assembly coupled to a mold and configured to vary a pressure in a mold cavity through operation of a moveable piston positioned within the mold cavity.

In any of the aspects or combinations of the aspects, the system may further include a temperature and pressure control assembly coupled to the shot tuning chamber and configured to adjust the temperature of and/or the pressure applied to the molten polymeric material in the shot tuning chamber.

In any of the aspects or combinations of the aspects, the temperature and pressure control assembly may include a moveable piston configured to adjust a volume of the shot tuning chamber.

In any of the aspects or combinations of the aspects, the temperature and pressure control assembly may include a coolant loop traversing a housing of the shot tuning chamber, a thermoelectric heater integrated within or coupled to the housing of the shot tuning chamber, and/or a thermoelectric cooler integrated within or coupled to the housing of the shot tuning chamber.

In any of the aspects or combinations of the aspects, the system may further include a controller having instructions stored in memory executable by a processor to operate the temperature and pressure control assembly to adjust the temperature of the molten polymeric material to decrease pressure losses in the system.

In any of the aspects or combinations of the aspects, adjusting the temperature within the shot tuning chamber may include one or more of decreasing the temperature of the molten polymeric material in the shot tuning chamber and increasing the temperature of the molten polymeric material within the shot tuning chamber, thereby creating the tuned molten polymeric material.

In any of the aspects or combinations of the aspects, adjusting the pressure within the mold cavity may include increasing the pressure within the mold cavity.

In any of the aspects or combinations of the aspects, adjusting the pressure within the mold cavity may include decreasing the pressure within the mold cavity.

In any of the aspects or combinations of the aspects, flowing the molten polymeric material into the shot tuning chamber from the upstream device may include advancing a screw housed in a barrel in the upstream device and/or increasing a volume of the shot tuning chamber.

In any of the aspects or combinations of the aspects, the blowing agent may be dissolved in the molten polymeric material, forming a molten SPS.

In any of the aspects or combinations of the aspects, the blowing agent may include a chemical blowing agent.

In any of the aspects or combinations of the aspects, the blowing agent may include a physical blowing agent.

In any of the aspects or combinations of the aspects, the physical blowing agent may be an SCF.

In any of the aspects or combinations of the aspects, adjusting the temperature, the pressure, or both, within the shot tuning chamber may include operating a temperature and pressure control assembly coupled to the shot tuning chamber.

In any of the aspects or combinations of the aspects, the molding system may further include a GCP assembly coupled to the mold cavity.

In any of the aspects or combinations of the aspects, the molding system may further include a temperature and pressure control assembly coupled to the shot tuning chamber and configured to adjust the pressure applied to and/or the temperature of the molten polymeric material in the shot tuning chamber.

In any of the aspects or combinations of the aspects, the temperature and pressure control assembly may include at least one of a moveable piston positioned in the shot tuning chamber, a coolant loop traversing a housing of the shot tuning chamber, a thermoelectric heater positioned in or coupled to the housing of the shot tuning chamber, and a thermoelectric cooler positioned in or coupled to the housing of the shot tuning chamber.

In any of the aspects or combinations of the aspects, the device configured to receive the polymeric material and heat the polymeric material to form the molten polymeric material may also be configured to receive a blowing agent from a blowing agent delivery assembly.

In any of the aspects or combinations of the aspects, the molten polymeric material may include a dissolved blowing agent, and the dissolved blowing agent and the molten polymeric material form a molten SPS.

In any of the aspects or combinations of the aspects, the molding system may further include a controller including instructions stored in memory executable by a processor to operate a temperature and pressure control assembly to adjust the temperature of the molten polymeric material and to decrease pressure losses in the molding system.

In any of the aspects or combinations of the aspects, the device may be an injection device including a barrel housing a screw.

In any of the aspects or combinations of the aspects, forming the molten polymeric material may include heating a polymeric material to form the molten polymeric material and flowing a blowing agent into the molten polymeric material.

In any of the aspects or combinations of the aspects, the blowing agent may be an SCF.

In any of the aspects or combinations of the aspects, adjusting the temperature, the pressure, or both, within the shot tuning chamber may include operating a temperature and pressure control assembly coupled to the shot tuning chamber.

In any of the aspects or combinations of the aspects, the temperature and pressure control assembly may include at least one of a coolant loop traversing a housing of the shot tuning chamber, a thermoelectric heater positioned in or coupled to the housing of the shot tuning chamber, and a thermoelectric cooler positioned in or coupled to the housing of the shot tuning chamber.

In any of the aspects or combinations of the aspects, the temperature and pressure control assembly may include a moveable piston positioned in the shot tuning chamber and the method further comprises moving the moveable piston to decrease a volume of the shot tuning chamber while the tuned molten polymeric material is flowed from the shot tuning chamber into the mold cavity.

In any of the aspects or combinations of the aspects, the molten polymeric material may include a dissolved fluid, the molten polymeric material and the dissolved fluid forming a molten SPS.

In any of the aspects or combinations of the aspects, where the dissolved fluid includes a blowing agent.

In any of the aspects or combinations of the aspects, adjusting the temperature of the molten polymeric material may include adjusting a flowrate of coolant circulated through a coolant loop traversing a housing of the intermediate chamber and where applying the controlled pressure to the molten polymeric material includes adjusting a position of a piston positioned within the intermediate chamber while the intermediate chamber is sealed.

In any of the aspects or combinations of the aspects, the molding system may further include a controller including instructions stored in memory executable by a processor to trigger a condition indicator when a desired set of conditions are reached in the shot tuning chamber.

In any of the aspects or combinations of the aspects, the coolant loop may traverse a top section of the shot tuning chamber and/or a piston in the shot tuning chamber.

Note that the example control and estimation routines included herein can be used with various system configurations. The control methods and routines disclosed herein may be stored as executable instructions in non-transitory memory and may be carried out by a molding system.

The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in a molding system, where the described actions are carried out by executing the instructions in the molding system including the various components. It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
a shot tuning chamber configured to receive a molten polymeric material from an upstream device and to dispense an adjusted molten polymeric material to a mold cavity of a mold, the shot tuning chamber comprising:
a temperature sensor and a pressure sensor to detect a temperature and pressure of a molten polymeric material;
a temperature control assembly having a coolant loop traversing a housing of the shot tuning chamber configured to adjust a temperature of the molten polymeric material; and
a pressure control assembly configured to adjust a pressure applied to the molten polymeric material, wherein the temperature control assembly and the pressure control assembly are configured to create the adjusted molten polymeric material.

2. The system of claim 1, wherein the upstream device is an injection device or an extrusion device, wherein the temperature of and the pressure applied to the molten polymeric material is adjusted independent of the injection device or the extrusion device.

3. The system of claim 1, wherein the upstream device is an injection device including a tuning chamber valve and a barrel housing a screw, wherein the injection device is configured to receive the molten polymeric material and to adjust a position of the screw in the barrel housing the screw, and to adjust the tuning chamber valve to regulate a flowrate of the molten polymeric material into a shot tuning chamber valve to regulate a flowrate of the molten polymeric material into the shot tuning chamber from the injection device.

4. The system of claim 1, wherein the upstream device is configured to receive a blowing agent from a blowing agent delivery assembly and form a molten single phase solution (SPS) comprised of the molten polymeric material having the blowing agent dissolved therein.

5. The system of claim 4, wherein the blowing agent includes a physical blowing agent or a chemical blowing agent.

6. The system of claim 5, wherein the physical blowing agent is a supercritical fluid (SCF).

7. The system of claim 1, further comprising an adjustable mold runner configured to regulate fluidic communication between the shot turning chamber and the mold cavity of the mold.

8. The system of claim 7, wherein the adjustable mold runner includes a plate with a plate opening and wherein movement of the plate into an open configuration aligns the plate opening with a mold cavity opening the mold.

9. The system of claim 1, wherein adjusting the temperature of the molten polymeric material includes decreasing the temperature of the molten polymeric material.

10. The system of claim 1, wherein the pressure control assembly comprises a gas counter pressure (GCP) assembly coupled to the mold cavity of the mold, wherein the GCP is configured to regulate an amount of counter pressure gas flow into and out of the mold cavity of the mold.

11. The system of claim 1, wherein the pressure control assembly comprises a mechanical pressure adjustment assembly coupled to the mold, wherein the mechanical pressure adjustment assembly is configured to vary a pressure in the mold cavity of the mold through operation of a moveable piston positioned within the mold cavity of the mold.

12. The system of claim 1, wherein the shot tuning chamber includes a moveable piston configured to adjust a volume of the shot tuning chamber.

13. The system of claim 1, wherein the temperature control assembly further includes a thermoelectric heater integrated within or coupled to the housing of the shot tuning chamber, and/or a thermoelectric cooler integrated within or coupled to the housing of the shot tuning chamber.

14. The system of claim 1, further comprising a controller including one or more computer memory devices storing instructions executable by a processor to operate the temperature control assembly and the pressure control assembly to adjust the temperature of the molten polymeric material to decrease pressure losses in the system.

15. A molding system comprising:
- a device configured to receive a polymeric material and heat the polymeric material to form a molten polymeric material;
- a shot tuning chamber configured to receive the molten polymeric material from the device and dispense an adjusted molten polymeric material to a mold cavity of a mold, the shot tuning chamber comprising:
  - a temperature sensor and a pressure sensor to detect a temperature and pressure of the molten polymeric material;
  - a temperature control assembly having a coolant loop traversing a housing of the shot tuning chamber configured to adjust a temperature of the molten polymeric material; and
  - a pressure control assembly configured to adjust a pressure applied to the molten polymeric material, wherein the temperature control assembly and the pressure control assembly are configured to create the adjusted molten polymeric material; and
- an adjustable mold runner configured to regulate flow of the adjusted molten polymeric material between the shot tuning chamber and a mold cavity of a mold.

16. The molding system of claim 15, wherein the pressure control assembly includes at least one of a moveable piston positioned in the shot turning chamber.

17. The molding system of claim 15, wherein the molten polymeric material is a molten single phase solution (SPS) comprising a dissolved blowing agent.

18. The molding system of claim 15, wherein the temperature control assembly further comprises a thermoelectric heater positioned in or coupled to the housing of the shot tuning chamber and a thermoelectric cooler positioned in or coupled to the housing of the tuning chamber.

19. The molding system of claim 15, wherein the pressure control assembly comprises a gas counter pressure (GCP) assembly coupled to the mold cavity of the mold, wherein the GCP is configured to regulate an amount of counter pressure gas flow into and out of the mold cavity of the mold.

20. The system of claim 15, wherein the adjustable mold runner includes a plate with a plate opening and wherein movement of the plate into an open configuration aligns the plate opening with the mold cavity opening in the mold.

* * * * *

UNITED STATES PATENT AND TRADEMARK OFFICE
CERTIFICATE OF CORRECTION

| | |
|---|---|
| PATENT NO. | : 11,370,155 B2 |
| APPLICATION NO. | : 16/578129 |
| DATED | : June 28, 2022 |
| INVENTOR(S) | : Hossein Allen Baghdadi et al. |

It is certified that error appears in the above-identified patent and that said Letters Patent is hereby corrected as shown below:

In the Specification

In Column 5, Line 16, delete "adodicarbonamide," and insert --azodicarbonamide,--.

In the Claims

In Claim 7, Column 26, Line 47, delete "shot turning" and insert --shot tuning--.

In Claim 16, Column 28, Line 11, delete "shot turning" and insert --shot tuning--.

Signed and Sealed this
Eighteenth Day of October, 2022

Katherine Kelly Vidal
*Director of the United States Patent and Trademark Office*